US007978900B2

(12) United States Patent
Nepomniachtchi et al.

(10) Patent No.: US 7,978,900 B2
(45) Date of Patent: *Jul. 12, 2011

(54) SYSTEMS FOR MOBILE IMAGE CAPTURE AND PROCESSING OF CHECKS

(75) Inventors: Grigori Nepomniachtchi, San Diego, CA (US); James DeBello, San Diego, CA (US)

(73) Assignee: Mitek Systems, Inc., San Diego, CA (US)

( * ) Notice: Subject to any disclaimer, the term of this patent is extended or adjusted under 35 U.S.C. 154(b) by 141 days.

This patent is subject to a terminal disclaimer.

(21) Appl. No.: 12/346,026

(22) Filed: Dec. 30, 2008

(65) Prior Publication Data

US 2009/0185737 A1 Jul. 23, 2009

Related U.S. Application Data

(60) Provisional application No. 61/022,279, filed on Jan. 18, 2008.

(51) Int. Cl.
*G06K 9/00* (2006.01)

(52) U.S. Cl. .............. 382/137; 705/39; 705/42; 705/45; 235/379

(58) Field of Classification Search .......... 382/137–140; 705/39–45; 235/379
See application file for complete search history.

(56) References Cited

U.S. PATENT DOCUMENTS

| | | | | |
|---|---|---|---|---|
| 5,761,686 A * | 6/1998 | Bloomberg | ............. | 715/234 |
| 6,038,553 A * | 3/2000 | Hyde, Jr. | .................... | 705/45 |
| 6,735,341 B1 * | 5/2004 | Horie et al. | ............... | 382/239 |
| 6,807,294 B2 * | 10/2004 | Yamazaki | ................. | 382/135 |
| 6,947,610 B2 * | 9/2005 | Sun | ............................ | 382/293 |
| 6,985,631 B2 * | 1/2006 | Zhang | ...................... | 382/237 |
| 7,301,564 B2 * | 11/2007 | Fan | ......................... | 348/222.1 |
| 7,377,425 B1 * | 5/2008 | Ma et al. | ................... | 235/379 |
| 7,593,595 B2 * | 9/2009 | Heaney et al. | ............ | 382/276 |
| 7,606,741 B2 * | 10/2009 | King et al. | ................. | 705/27 |
| 7,793,831 B2 * | 9/2010 | Beskitt | ..................... | 235/379 |
| 2002/0012462 A1 * | 1/2002 | Fujiwara | .................. | 382/165 |
| 2002/0041717 A1 * | 4/2002 | Murata et al. | ............. | 382/275 |
| 2002/0067846 A1 * | 6/2002 | Foley | ....................... | 382/139 |
| 2003/0086615 A1 * | 5/2003 | Dance et al. | .............. | 382/200 |
| 2004/0012679 A1 * | 1/2004 | Fan | ......................... | 348/207.99 |
| 2005/0097046 A1 * | 5/2005 | Singfield | ................... | 705/42 |
| 2005/0242186 A1 * | 11/2005 | Ohbuchi | ................. | 235/462.09 |
| 2006/0045379 A1 * | 3/2006 | Heaney et al. | ............ | 382/276 |
| 2006/0140504 A1 * | 6/2006 | Fujimoto et al. | .......... | 382/275 |

(Continued)

*Primary Examiner* — Bhavesh M Mehta
*Assistant Examiner* — Sean Motsinger
(74) *Attorney, Agent, or Firm* — Procopio Cory Hargreaves & Savitch LLP; Noel C. Gillespie

(57) ABSTRACT

The present invention relates to automated document processing and more particularly, to methods and systems for document image capture and processing using mobile devices. In accordance with various embodiments, methods and systems for document image capture on a mobile communication device are provided such that the image is optimized and enhanced for data extraction from the document as depicted. These methods and systems may comprise capturing an image of a document using a mobile communication device; submitting the image to a server; and processing the image to create a bi-tonal image of the document for data extraction. Additionally, these methods and systems may comprise capturing a first image of a document using the mobile communication device; automatically detecting the document within the image; geometrically correcting the image; binarizing the image; correcting the orientation of the image; correcting the size of the image; and outputting the resulting image of the document.

19 Claims, 21 Drawing Sheets

U.S. PATENT DOCUMENTS

| | | | |
|---|---|---|---|
| 2006/0164682 A1* | 7/2006 | Lev | 358/1.15 |
| 2006/0210192 A1* | 9/2006 | Orhun | 382/275 |
| 2006/0221415 A1* | 10/2006 | Kawamoto | 358/518 |
| 2006/0291727 A1* | 12/2006 | Bargeron | 382/218 |
| 2007/0171288 A1* | 7/2007 | Inoue et al. | 348/241 |
| 2007/0206877 A1* | 9/2007 | Wu et al. | 382/275 |
| 2008/0062437 A1* | 3/2008 | Rizzo | 358/1.2 |
| 2009/0092322 A1* | 4/2009 | Erol et al. | 382/224 |
| 2010/0073735 A1* | 3/2010 | Hunt et al. | 358/462 |
| 2010/0104171 A1* | 4/2010 | Faulkner et al. | 382/137 |

* cited by examiner (The Figure is Intentionally Blurry)

(The Figure is Intentionally Blurry)

Jonnie Kash
246 Somewhere Dr.
Somewhere City, CA 12312
614-555-9223

1329

Date  11-12-06

Pay to the order of  S. D. G. & E.

Amount  $ 46.11

Forty six and 11/100 _____ Dollars

Bank Two
8911 Balboa Ave,
San Diego, CA 92116
800-246-8900

Memo _____  Jonnie Kash

John Smith
000123456789
WE-1

A LATE FEE MAY APPLY TO PAYMENTS RECEIVED AFTER: 12-17-07

| BALANCE | MINIMUM PMT. | INTEREST |
|---|---|---|
| $ 715.50 | $ 238.40 | $ 79.43 |

AMOUNT ENCLOSED $

MAKE CHECK PAYABLE TO: BANK TWO

Bank Two
8911 Balboa Ave,
San Diego, CA 92116

(The Check within the Figure is Intentionally in Landscape Orientation)

(The Figure is Intentionally Bi-Tonal)

(The Figure is Intentionally Oriented Up-side Down)

US 7,978,900 B2

SYSTEMS FOR MOBILE IMAGE CAPTURE AND PROCESSING OF CHECKS

RELATED APPLICATION

This application claims the benefit of U.S. Provisional application(s) Ser. No. 61/022,279 filed Jan. 18, 2008, which is hereby incorporated herein by reference.

FIELD OF THE INVENTION

The present invention relates generally to automated document processing and more particularly, to systems and methods for document image processing that enhances an image for data extraction from images captured on a mobile device with camera capabilities.

BACKGROUND OF THE INVENTION

In general, financial institutions have automated most check processing systems by printing financial information, such as account numbers and bank routing numbers, onto the checks. Before a check amount is deducted from a payer's account, the amount, account number, and other important information must be extracted from the check. This highly automated form of extraction is done by a check processing control system that captures information from the Magnetic Ink Character Recognition ("MICR") line. The MICR line consists of specially designed numerals that are printed on the bottom of a check using magnetic ink. The MICR data fields include the bank routing number, bank transit number, account number, check serial number, check amount, process code and extended process code.

Checks and other documents may be processed by banks and other financial institutions in large numbers. The documents that may be processed might include checks, deposit slips, payment slips, etc. In some cases the banks or other financial institutions may be required to use the actual physical documents. For example, checks might need to be transported between multiple banks or other financial institutions. This may slow down the processing of financial documents. In addition, other types of documents that are non-financial in nature may be processed by businesses and other institutions in large volumes.

SUMMARY OF THE INVENTION

In order to facilitate processing of a document depicted in an image captured by a mobile device, embodiments of the systems and methods described herein provide image optimization and enhancement such that data can be extracted from the document. Some systems and methods described herein specifically involve a mobile communication device capturing an image of a document and then transmitting that image to a server for image optimization and enhancement.

The present invention relates to automated document processing and more particularly, to methods and systems for document image capture and processing using mobile devices. In accordance with various embodiments, methods and systems for document image capture on a mobile communication device are provided such that the image is optimized and enhanced for data extraction from the document as depicted. These methods and systems may comprise capturing an image of a document using a mobile communication device; transmitting the image to a server; and processing the image to create a bi-tonal image of the document for data extraction. For example, a mobile communication devices, such as a camera phone, would transmit the image of the document to the server, where the image is processed and results in a bi-tonal image of the document.

Some embodiments of the invention may allow the users to transmit images of the documents using a mobile communication device. Additionally, methods and systems are disclosed that allow the transmission of such information using a mobile communication device such as, for example, a mobile telephone handset with a camera (also known as a camera phone). Many people may benefit from these systems and methods because a large number of people currently carry and use handheld mobile communication devices.

In accordance with some embodiments of the invention, methods and systems for document capture on a mobile communication device further comprise requiring a user to login into an application. In this way access to the document capture system using a mobile communication device might be limited to authorized users. The methods and systems may further comprise selecting a type of document and entering an amount. Some systems may receive a status at the mobile communication device.

In other various embodiments, processing the image may comprise processing the image on the mobile communication device, processing the image on the server or processing the image on the mobile communication device and the server. Processing the image may comprise converting the image to gray-scale, detecting a quadrangle and correcting the image. In some embodiments, processing the image may comprise converting the image to a bi-tonal image.

In yet other embodiments, the methods and systems in accordance with the invention may comprise capturing an image of a document using the mobile communication device; automatically detecting the document within the captured image; geometrically correcting the image; binarizing the captured image; correcting the orientation of the captured image; correcting the size of the captured image; and outputting the modified captured image of the document.

In further embodiments, the automatic detection of the document may comprise determining a plurality of corners belonging to the document depicted within the captured image. In yet further embodiments, the automatic detection of the document may comprise converting the first image to a color "icon" image; reducing color within the color "icon" image, thereby resulting in a gray-scale "icon" image; and determining the plurality of corners belonging to the document depicted within the captured image.

In other embodiments, the geometric correction comprises reducing color within the captured image, resulting in a gray-scale image; building a projective transformation model that maps the document within the gray-scale image to a gray-scale document image; and applying the projective transformation model to the first image, resulting in the gray-scale document image. Further embodiments include a geometric correction further comprising correcting the orientation of the document within a gray-scale "icon" image if the document within the captured image is in landscape orientation; and building the projective transformation model from the gray-scale "icon" image.

In some embodiments, correcting the orientation of the captured image comprises correcting the orientation of the document within the third image if the document is in upside-down orientation. In some such embodiments, correcting the orientation of the captured image further comprises determining the orientation of the document within the third image using an MICR-line on the document.

In other embodiments, correcting the size of the fourth image comprises reading a relevant object of a known position on the document within the captured image; computing an average width of the relevant object; computing a scaling factor based on the average width of the relevant object; using the scaling factor to determine whether the captured image needs a size correction; applying a size correction to the captured image, resulting in a resized image; geometrically correcting the resized captured image, resulting in a corrected captured image; binarizing the corrected captured image, resulting in a binarized image; and outputting the binarized modified captured image.

In various embodiments, the captured image is a color image. In other embodiments, the outputted modified captured image is a bi-tonal image of the document. In yet further embodiments, the outputted modified captured image is a gray-scale image of the document.

In further embodiments, the mobile communication device is a camera phone. In yet further embodiments, the mobile communication device transmits the image of the document to the server. In some of these embodiments, once the server receives the image, the image processed, resulting in a optimized and enhanced image.

In some embodiments of the invention, a computer program product is provided, comprising a computer useable medium having computer program code embodied therein for enabling a computing device to perform operations in accordance with some of the methods described herein.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 8 is a diagram illustrating an example bi-tonal image of the check of FIGS. 1 and 3 in accordance with the systems and methods described herein.

FIG. 9 is a diagram illustrating an example bi-tonal image of the payment coupon of FIGS. 2 and 4 in accordance with the systems and methods described herein.

DETAILED DESCRIPTION OF THE PREFERRED EMBODIMENTS

Figure 1:
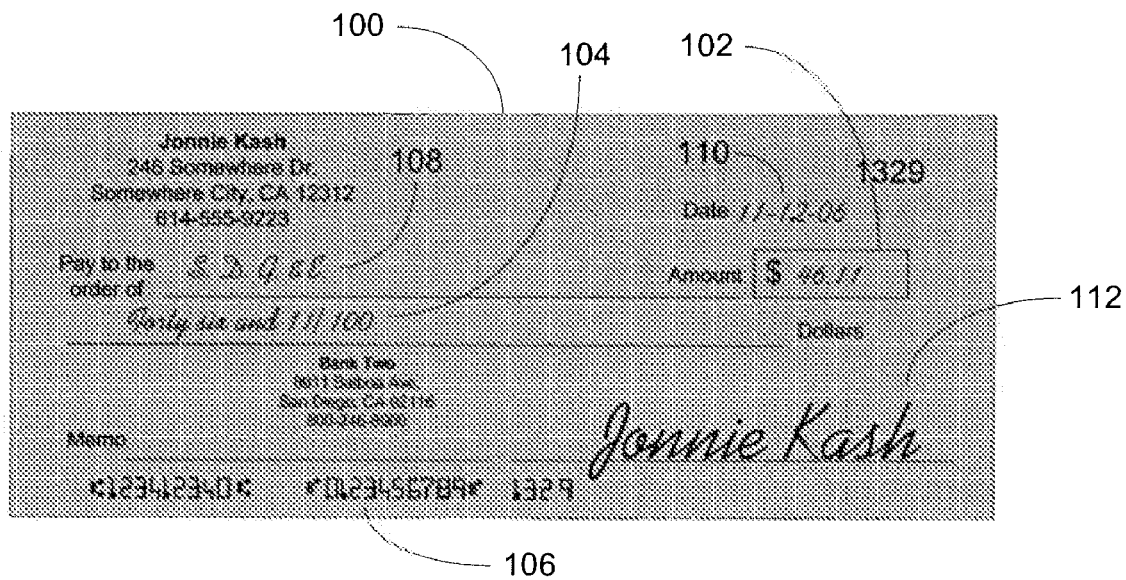
FIG. 1 is a diagram illustrating an example check that might be imaged with the systems and methods described herein.

The present invention is directed towards automated document processing and systems and methods for document image processing using mobile devices. Generally, some embodiments of the invention capture an original color image of a document using a mobile device and then converted the color image to a bi-tonal image. More specifically, some embodiments accept a color image of a check taken by a mobile device and convert it into a bi-tonal image of the check that is substantially equivalent in its resolution, size, and quality to check images produced by "standard" scanners.

Before describing the invention in greater detail, it would be useful to define some of the common terms used herein when describing various embodiments of the invention.

The term "standard scanners" includes, but is not limited to, transport scanners, flat-bed scanners, and specialized check-scanners. Some manufacturers of transport scanners include UNISYS®, BancTec®, IBM®, and Canon®. With respect to specialized check-scanners, some models include the TellerScan® TS200 and the Panini® My Vision X. Generally, standard scanners have the ability to scan and produce high quality images, support resolutions from 200 dots per inch to 300 dots per inch (DPI), produce gray-scale and bi-tonal images, and crop an image of a check from a larger full-page size image. Standard scanners for other types of documents may have similar capabilities with even higher resolutions and higher color-depth.

The term "color images" includes, but is not limited to, images having a color depth of 24 bits per a pixel (24 bit/pixel), thereby providing each pixel with one of 16 million possible colors. Each color image is represented by pixels and the dimensions W (width in pixels) and H (height in pixels). An intensity function I maps each pixel in the [W×H] area to its RGB-value. The RGB-value is a triple (R,G,B) that determines the color the pixel represents. Within the triple, each of the R(Red), G(Green) and B(Blue) values are integers between 0 and 255 that determine each respective color's intensity for the pixel.

The term, "gray-scale images" includes, but is not limited to, images having a color depth of 8 bits per a pixel (8 bit/pixel), thereby providing each pixel with one of 256 shades of gray. As a person of ordinary skill in the art would appreciate, gray-scale images also include images with color depths of other various bit levels (e.g. 4 bit/pixel or 2 bit/pixel). Each gray-scale image is represented by pixels and the dimensions W (width in pixels) and H (height in pixels). An intensity function I maps each pixel in the [W×H] area onto a range of gray shades. More specifically, each pixel has a value between 0 and 255 which determines that pixel's shade of gray.

Bi-tonal images are similar to gray-scale images in that they are represented by pixels and the dimensions W (width in pixels) and H (height in pixels). However, each pixel within a bi-tonal image has one of two colors: black or white. Accordingly, a bi-tonal image has a color depth of 1 bit per a pixel (1 bit/pixel). The similarity transformation, as utilized by some embodiments of the invention, is based off the assumption that there are two images of [W×H] and [W'×H'] dimensions, respectively, and that the dimensions are proportional (i.e. W/W'=H/H'). The term "similarity transformation" may refer to a transformation ST from [W×H] area onto [W'×H'] area such that ST maps pixel p=p(x,y) on pixel p'=p'(x',y') with x'=x*W'/W and y=y*H'/H.

Figure 2:
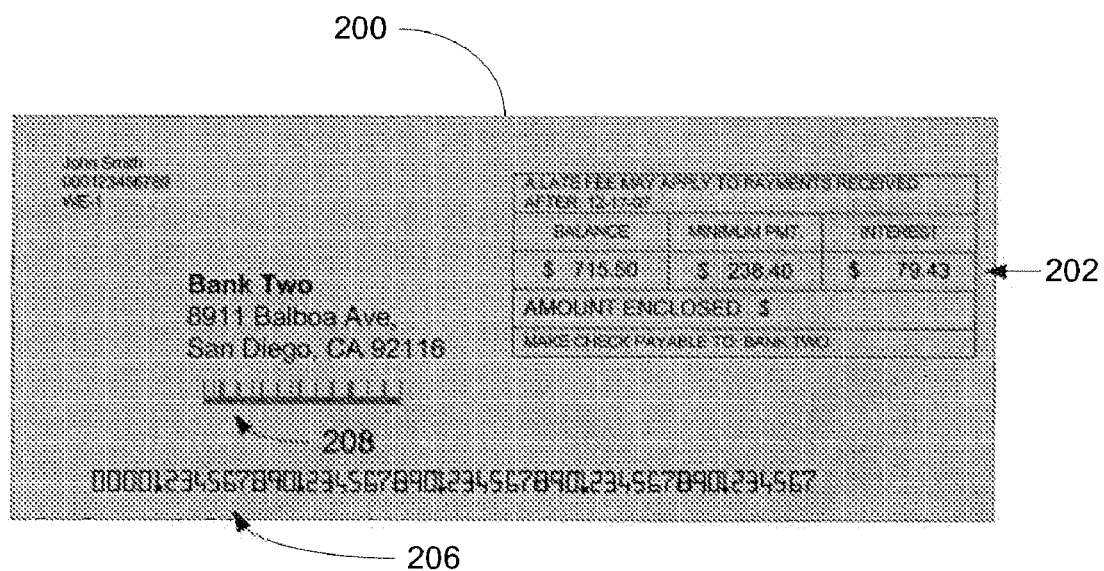
FIG. 2 is a diagram illustrating an example payment coupon that might be imaged using the systems and methods described herein.

FIG. 1 is a diagram illustrating an example check 100 that might be imaged with the systems and methods described herein. The mobile image capture and processing systems and methods may be used with a variety of documents, including financial documents such as personal checks, business checks, cashier's checks, certified checks, warrants or other documents. By using an image of the check 100, the check clearing process is performed more efficiently. As would be appreciated by those of skill in the art, checks are not the only type of documents that may be used with these systems. For example, other documents, such as deposit slips, might also be processed using the systems and methods described herein. FIG. 2 is a diagram illustrating an example payment coupon 200 that might be imaged using the systems and methods described herein.

In some embodiments, checks 100, payment coupons 200, or other documents might be imaged using a mobile device. The mobile device may be a mobile telephone handset, Personal Digital Assistant, or other mobile communication device. The mobile device may include a camera, or might include functionality that allows it to connect to a camera. This connection might be wired or wireless. In this way the mobile device may connect to an external camera and receive images from the camera.

Images of the documents taken using the mobile device or downloaded to the mobile device may be transmitted to a server. For example, in some cases, the images may be transmitted over a mobile communication device network, such as a code division multiple access ("CDMA") telephone network, or other mobile telephone network. Images taken using, for example, a mobile device's camera, may be 24 bit per pixel (24 bit/pixel) JPG images. It will be understood, however, that many other types of images might also be taken using different cameras, mobile devices, etc.

Various documents may include various fields. Some of the fields in the documents might be considered "primary" fields. For example, the primary fields of interest on a check 100 might include the legal 102 and courtesy 104 amounts and the MICR line 106. Other fields of interest may include the payee 108, date 110 and the signature 112. The primary fields of interest for the payment coupon 200 might include the payment amounts 202, such as the balance, minimum payment and interest. The billing company name and address 204, the account number 206 and the code-line 208 may also be fields of interest. In some embodiments it may be necessary to electronically read various information from these fields on a document. For example, in order to process a check that is to be deposited, it might be necessary to electronically read the legal 102 and courtesy 104 amounts, the MICR line 106, the payee 108, date 110 and the signature 112 on the check. In some cases, this information is difficult to read because, for example, the check or other document is out of focus or is otherwise poorly imaged.

Figure 3:
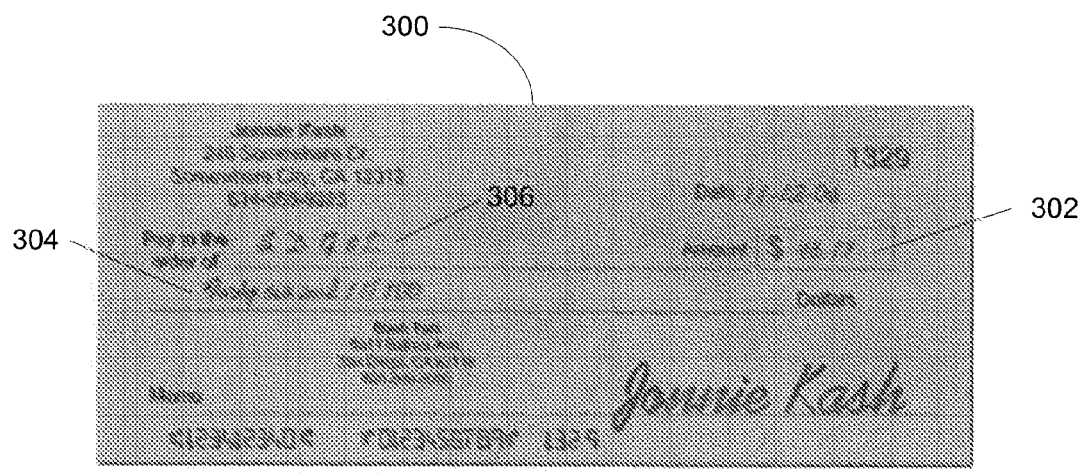
FIG. 3 is a diagram illustrating an example out-of-focus image of the check illustrated in FIG. 1.
Figure 4:
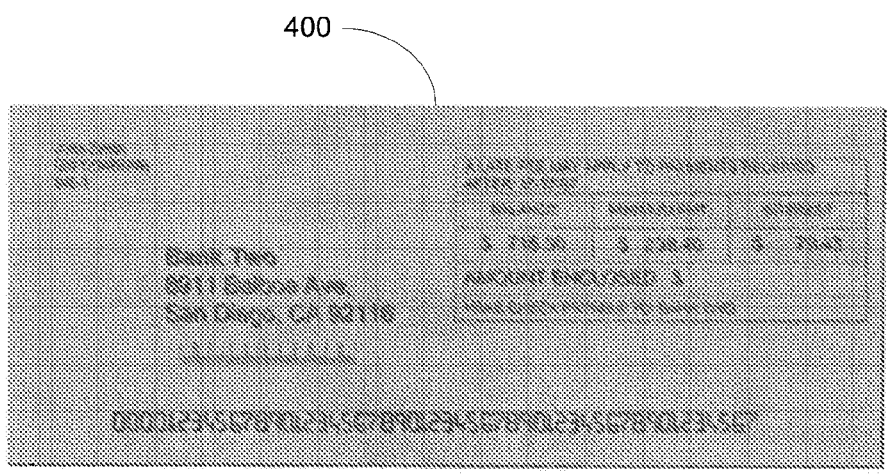
FIG. 4 is a diagram illustrating an example out-of-focus image of the payment coupon illustrated in FIG. 2.

FIG. 3 is a diagram illustrating an example out-of-focus image of the check illustrated in FIG. 1. In some cases, document images might be out of focus. An image of a document that is out of focus may be difficult or impossible to read, electronically process, etc. For example, it might be difficult to read the amount 302 and 304 or the payee 306 on the image 300 of the check 100. FIG. 4 is a diagram illustrating an example out-of-focus image of the payment coupon illustrated in FIG. 2. Because the image 400 of the payment coupon 200 is out of focus it might be difficult to properly credit the payment. For example, the payment might be credited to the wrong account or an incorrect amount might be credited. This may be especially true if a check and a payment coupon are both difficult to read or the scan quality is poor.

Many different factors may affect the quality of an image and the ability of a mobile device based image capture and processing system. Optical defects, such as out-of-focus images (as discussed above), unequal contrast or brightness, or other optical defects, might make it difficult to process an image of a document (e.g., a check, payment coupon, deposit slip, etc.) The quality of an image may also be affected by the document position on a surface when photographed or the angle at which the document was photographed. This affects the image quality by causing the document to appear, for example, right side up, upside down, skewed, etc. Further, if a document is imaged while upside-down it might be impossible or nearly impossible to for the system to determine the information contained on the document.

In some cases, the type of surface might affect the final image. For example, if a document is sitting on a rough surface when an image is taken, that rough surface might show through. In some cases the surface of the document might be rough because of the surface below it. Additionally, the rough surface may cause shadows or other problems that might be picked up by the camera. These problems might make it difficult or impossible to read the information contained on the document.

Lighting may also affect the quality of an image, for example, the location of a light source and light source distortions. Using a light source above a document might light the document in a way that improves the image quality, while a light source to the side of the document might produce an image that is more difficult to process. Lighting from the side might, for example, cause shadows or other lighting distortions. The type of light might also be a factor, for example, sun, electric bulb, florescent lighting, etc. If the lighting is too bright, the document might be washed out in the image. On the other hand, if the lighting is too dark, it might be difficult to read the image.

The quality of the image might also be affected by document features, such as, the type of document, the fonts used, the colors selected, etc. For example, an image of a white document with black lettering may be easier to process than a dark colored document with black letters. Image quality may also be affected by the mobile device used. Some mobile camera phones, for example, might have cameras that save an image using a greater number of mega pixels. Other mobile cameras phones might have an auto-focus feature, automatic flash, etc. Generally, these features may improve an image when compared to mobile devices that do not include such features.

A document image taken using a mobile device might have one or more of the defects discussed above. These defects or others may cause low accuracy when processing the image, for example, when processing one or more of the fields on a document. Accordingly, in some embodiments, systems and methods using a mobile device to create images of documents may include the ability to identify poor quality images. If the quality of an image is determined to be poor, a user may be prompted to take another image.

A variety of metrics might be used to detect an out-of-focus image. For example, a focus measure may be employed. The focus measure may be the ratio of the maximum video gradient between adjacent pixels measured over the entire image and normalized with respect to an image's gray level dynamic range and "pixel pitch". The pixel pitch may be the distance between dots on the image. In some embodiments a focus score might be used to determine if an image is adequately focused. If an image is not adequately focused, a user might be prompted to take another image.

An image focus score might be calculated as a function of maximum video gradient, gray level dynamic range and pixel pitch. For example, in one embodiment:

$$\text{Image Focus Score} = (\text{Maximum Video Gradient}) * (\text{Gray Level Dynamic Range}) * (\text{Pixel Pitch}) \quad (\text{eq. 1})$$

The video gradient may be the absolute value of the gray level for a first pixel "i" minus the gray level for a second pixel "i+1". For example:

$$\text{Video Gradient} = ABS[(\text{Grey level for pixel ``i''}) - (\text{Gray level for pixel ``i+1''})] \quad (\text{eq. 2})$$

The gray level dynamic range may be the average of the "n" lightest pixels minus the average of the "n" darkest pixels. For example:

$$\text{Gray Level Dynamic Range} = [\text{AVE}(\text{``N'' lightest pixels}) - \text{AVE}(\text{``N'' darkest pixels})] \quad (\text{eq. 3})$$

In equation 3 above, N may be defined as the number of pixels used to determine the average darkest and lightest pixel gray levels in the image. In some embodiments, N might be chosen to be 64. Accordingly, in some embodiments, the 64 darkest pixels are averaged together and the 64 lightest pixels are averaged together to compute the gray level dynamic range value.

The pixel pitch may be the reciprocal of the image resolution, for example, in dots per inch.

$$\text{Pixel Pitch} = [1/\text{Image Resolution}] \quad (\text{eq. 4})$$

In other words, as defined above, the pixel pitch is the distance between dots on the image because the Image Resolution is the reciprocal of the distance between dots on an image.

Figure 5:
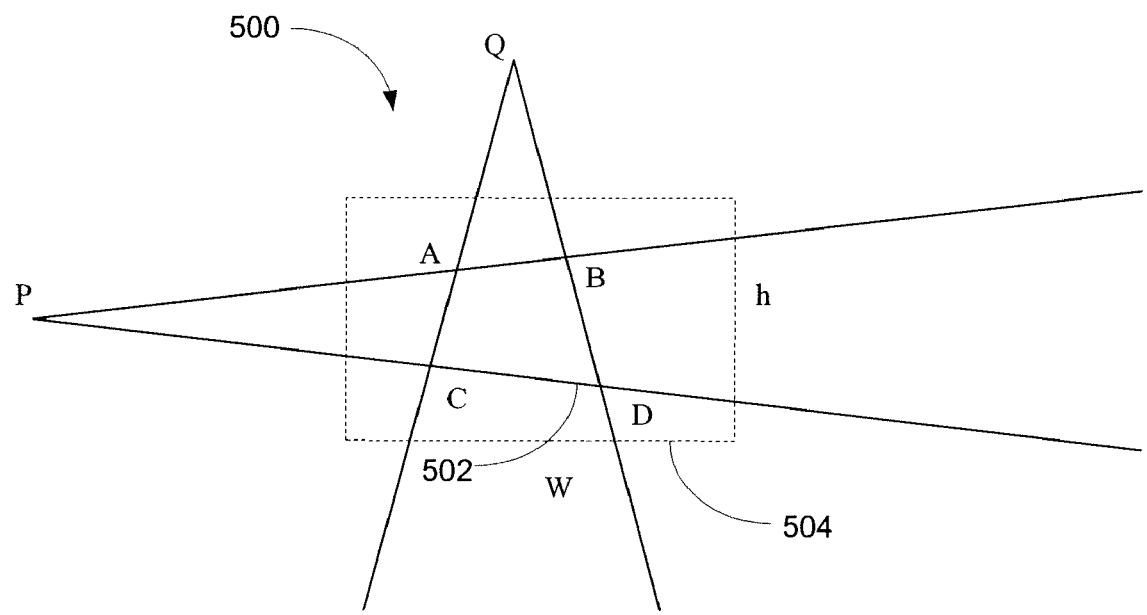
FIG. 5 is a diagram illustrating an example of perspective distortion in an image of a rectangular shaped document.

FIG. 5 is a diagram illustrating an example of perspective distortion in an image of a rectangular shaped document. An image may contain perspective transformation distortions 500 such that a rectangle might become a quadrangle ABCD 502, as illustrated in the figure. The perspective distortion may occur because an image is taken using a camera that is placed at an angle to a document rather than directly above the document. When directly above a rectangular document it will generally appear to be rectangular. As the imaging device moves from directly above the surface, the document distorts until it can no longer be seen and only the edge of the page may be seen.

The dotted frame 504 comprises the image frame obtained by the camera. The image frame is be sized h×w, as illustrated in the figure. Generally, it may be preferable to contain an entire document within the h×w frame of a single image. It will be understood, however, that some documents might be too large or include too many pages for this to be preferable or even feasible.

In some embodiments, an image might be processed, or preprocessed, to automatically find and "lift" the quadrangle 502. In other words, the document that forms quadrangle 502 might be separated from the rest of the image so that the document alone might be processed. By separating quadrangle 502 from any background in an image, it may then be further processed.

The quadrangle 502 might be mapped onto a rectangular bitmap in order to remove or decrease the perspective distortion. Additionally, image sharpening might be used to improve the out-of-focus score of the image. The resolution of the image may then be increased and the image converted to a black-and-white image. In some cases, a black-and-white image might have a higher recognition rate when processed using an automated document processing system in accordance with the systems and methods described herein.

An image that is bi-tonal, e.g., black-and-white, might be used in some systems. Such systems might require an image that is at least 200 dots per inch resolution. Accordingly, a color image taken using a mobile device might need to be high enough quality so that the image may successfully be converted from, for example, a 24 bit per pixel (24 bit/pixel) RGB image to a bi-tonal image. The image may be sized as if the document, e.g., check, payment coupon, etc., was scanned at 200 dots per inch.

Figure 6:
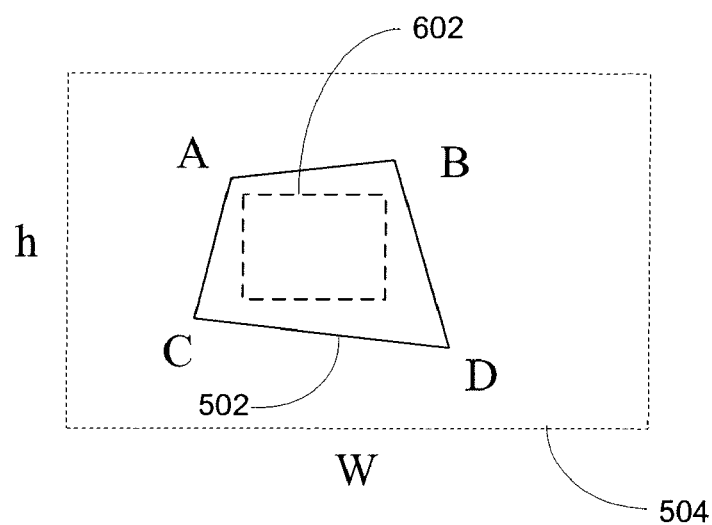
FIG. 6 is a diagram illustrating an example original image, focus rectangle and document quadrangle ABCD in accordance with the example of FIG. 5.

FIG. 6 is a diagram illustrating an example original image, focus rectangle and document quadrangle ABCD in accordance with the example of FIG. 5. In some embodiments it may be necessary to place a document for processing at or near the center of an input image close to the camera. All points A, B, C and D are located in the image, and the focus rectangle 602 is located inside quadrangle ABCD 502. The document might also have a low out-of-focus score and the background surrounding the document might be selected to be darker than the document. In this way, the lighter document will stand out from the darker background.

Figure 7:
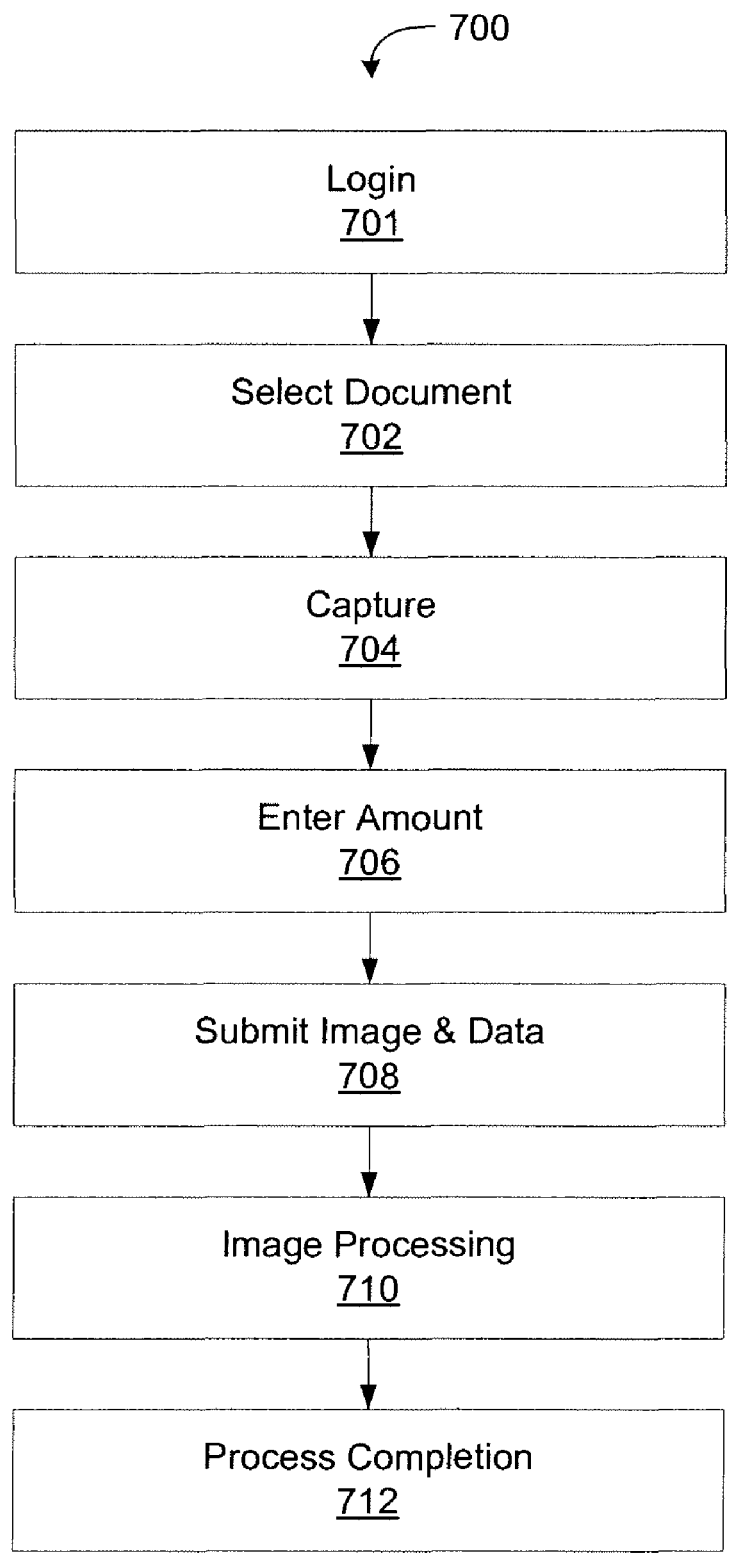
FIG. 7 is a flowchart illustrating an example method in accordance with the systems and methods described herein.

FIG. 7 is a flowchart illustrating an example method 700 in accordance with the systems and methods described herein. Referring now to FIG. 7, in operation 701 a user logs into a document capture system on a mobile communication device. In accordance with various embodiments, methods and systems for document capture on a mobile communication device may further comprise requiring the user to log into an application. In this way, access to the document capture system using a mobile communication device might be limited to authorized users.

In operation 702, in the illustrated embodiment, the type of document is selected. For example, a user might select a document type for a check, payment coupon or deposit slip. By entering the type of document, a mobile device might be able to scan specific parts of an image to determine, for example, payee, check amount, signature, etc. In some embodiments, however, a device might determine what type of document is being imaged by processing the image.

In operation 704, an image is captured using, for example, a mobile communication device. In the illustrated embodiment an application running on the mobile communication device may prompt the user of the device to take a picture of the front of the document. The back of the document might also be imaged. For example, if the document is a check, an image of the back of the document might be necessary because the back of the check might need to be endorsed. If the back of the document needs to be imaged, the application may prompt the user to take the image. The application might also conduct some image processing to determine if the quality of the image or images is sufficient for further processing in accordance with the systems and methods described herein. The quality needed for further processing might vary from implementation to implementation. For example, some systems might be better able to determine information contained on a poor quality image then other systems.

In the illustrated embodiment, at operation 706, an amount is entered. When the document being processed is a check, the amount entered may be the amount of the check. Alternatively, the amount might be an amount of a payment or an amount of a deposit, depending on the type of document being processed.

In some embodiments, the system might determine the amount by processing the image. For example, in some cases, optical character recognition ("OCR") might be used to determine what characters and numbers are present on the document. For example, numbers located in the amount box of a check or payment coupon might then be determined using OCR or other computer based character determination. This might be done instead of requiring the amount to be entered manually. In other embodiments, a manual entry might be used to verify a computer generated value that is determined using, for example, OCR or other computer based character determination.

In operation 708, the image is transmitted to a server. The image might be transmitted from the mobile communication device that captured the image of the document (e.g. camera phone) using, for example, hypertext transfer protocol ("HTTP") or mobile messaging service ("MMS"). The server might then confirm that the image was received by, for example, transmitting a message back to the mobile device.

In operation 710, image processing is performed. In the example embodiment, the server may clean up the image be performing auto-rotate, de-skew, perspective distortion correction, cropping, etc. The server might also process the image to produce a bi-tonal image for data extraction.

In other embodiments, some or all data processing might be performed at the mobile communication device. For example, the mobile communication device might perform auto-rotate, de-skew, perspective distortion correction, cropping, etc. Additionally, the mobile device might also process the image to produce a bi-tonal image for data extraction. In some cases, the processing might be shared between the mobile device and the server.

In operation 712, the processing of the document using a mobile device is completed. For example, when the server has confirmed that all necessary data can be extracted from a received image, it might transmit a status message to the mobile device that transmitted the image. Alternatively, if some necessary data cannot be extracted, the server may transmit a request for additional data. This request might include a request for an additional image. In some cases, the request may be for data entered by a user, for example, an amount, e.g., of a check, that might be entered using a key pad on the mobile communication device.

In some embodiments, the quality of the image is determined at the mobile device. In this way the number of requests from the server for additional images might be reduced. The request may come directly from the mobile device. This may allow for the request to be more quickly determined and may allow a user to take an additional image within a shorter time from the earlier image. This may mean, for example, that the user is still physically close to the document and is still holding the communication device. This might make it easier to retake an image. If the image quality processing occurs at a server it might take longer to determine that the image quality is acceptable and communicate that information back to a user. This may mean the user is no longer near the document or has started performing another task. It will be understood, however, that in some embodiments, a server based implementation might be employed to off-load processing demands from the mobile device. Additionally, in some cases it might be quick as or quicker than a system that uses the mobile communication device to process an image to determine image quality.

FIG. 8 is a diagram illustrating an example bi-tonal image 800 of the check of FIGS. 1 and 3 in accordance with the systems and methods described herein. FIG. 9 is a diagram illustrating an example bi-tonal image 900 of the payment coupon of FIGS. 2 and 4 in accordance with the systems and methods described herein. As illustrated, in the bi-tonal images of FIGS. 8 and 9, the necessary information (such as payees, amounts, account number, etc.) has been preserved, while extra information has been removed. For example, background patterns that some people might have on there checks are not present in the bi-tonal image 800 of the check.

Figure 10:
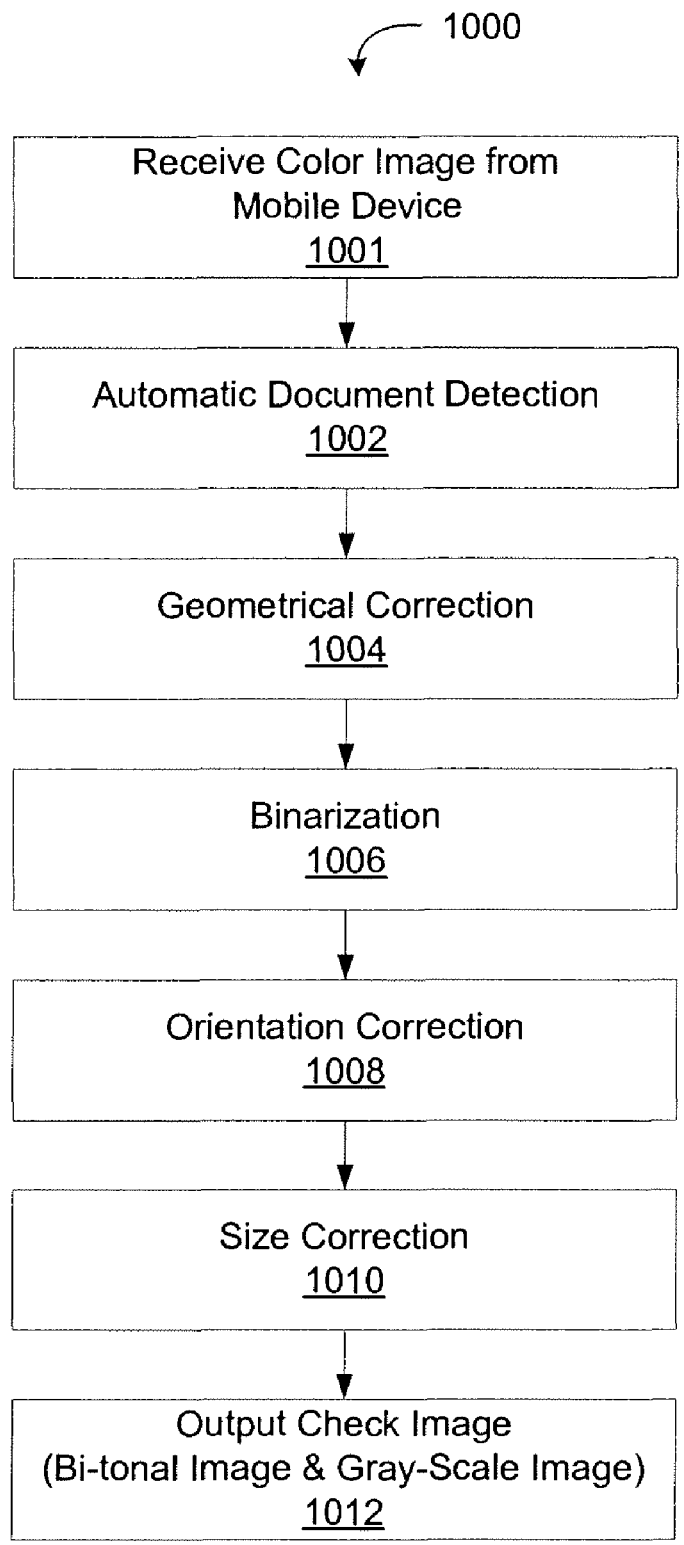
FIG. 10 is a flowchart of an example method in accordance with the invention that is used during image processing stages in accordance with the systems and methods described herein.

FIG. 10 is a flowchart of an example method 1000 in accordance with the invention that is used during image processing stages. In particular, some or all of the operations illustrated in FIG. 10 can be performed during various operations illustrated in FIG. 7. Referring now to FIG. 10, at operation 1001 the method 700 receives a color image originally taken by the mobile device (also referred to as the "mobile image"). For example, the image might originate from a camera phone which has now transmitted the image to a server for post-capture processing in accordance with the invention. This mobile image has a document located somewhere within the image. In order to detect the document, the invention utilizes an automatic document detection module at operation 1002. Depending on the embodiment, the automatic document detection module may be specialized in detecting only certain types of documents such as financial documents (e.g. checks or deposit coupons), or may be general in detecting a variety of types of transactional documents. At the conclusion of the automatic document detection operation, the positions of the document corners are outputted (e.g. check corners) as corners A, B, C and D of quadrangle ABCD (e.g. quadrangle ABCD 502). Further details in regards to the automatic document detection operation will be provided with respect to FIG. 11A.

Following the automatic document detection, method 1000 performs geometrical corrections to the mobile image at operation 1004. As previously noted, this can comprise cleaning up the image by performing auto-rotate operations, de-skew operations, perspective distortion correction operations, and cropping operations. Generally, this is due to perspective distortions present in the original mobile image, as well as the possibility of incorrect orientation of the document within the mobile image. The discussion of FIG. 15*a* will provide further detail with respect to the geometrical correction operation.

Next follows the binarization of the image at operation 1006. Binarization of the image is also referred to as generating a bi-tonal image of the document at 1 bit per pixel. Binarization of the image is usually required by the Remote Deposit Systems for processing. This binarization operation utilized by one embodiment of the present invention will discussed in further detail with respect to FIG. 16*a*.

A size correction operation 1010 may be employed since many processing engines are sensitive to the image size. For example, in the context of checks, the processing engine for amount recognition may rely on the check size to distinguish personal checks from business checks, whereas the processing engine for form identification may rely on document size as an important characteristic in determining the form type. Size correction operation 1010 will be discussed in greater detail with respect to FIG. 18.

Method 1000 concludes by outputting the document as a bi-tonal image and a gray-scale image at operation 1012. These images are subsequently utilized in processing (e.g. financial processing), depending on the type of document represented in the image. Usually, this financial processing is performed during the process completion described with respect with operation 712 of FIG. 7. The bi-tonal image is an image that is recognition-friendly by financial processing systems.

Continuing with reference to the automatic document detection operation previously described with respect to operation 1002 of FIG. 10, FIGS. 11-14 illustrate the operations of automatic document detection with greater specificity.

Figure 11A:
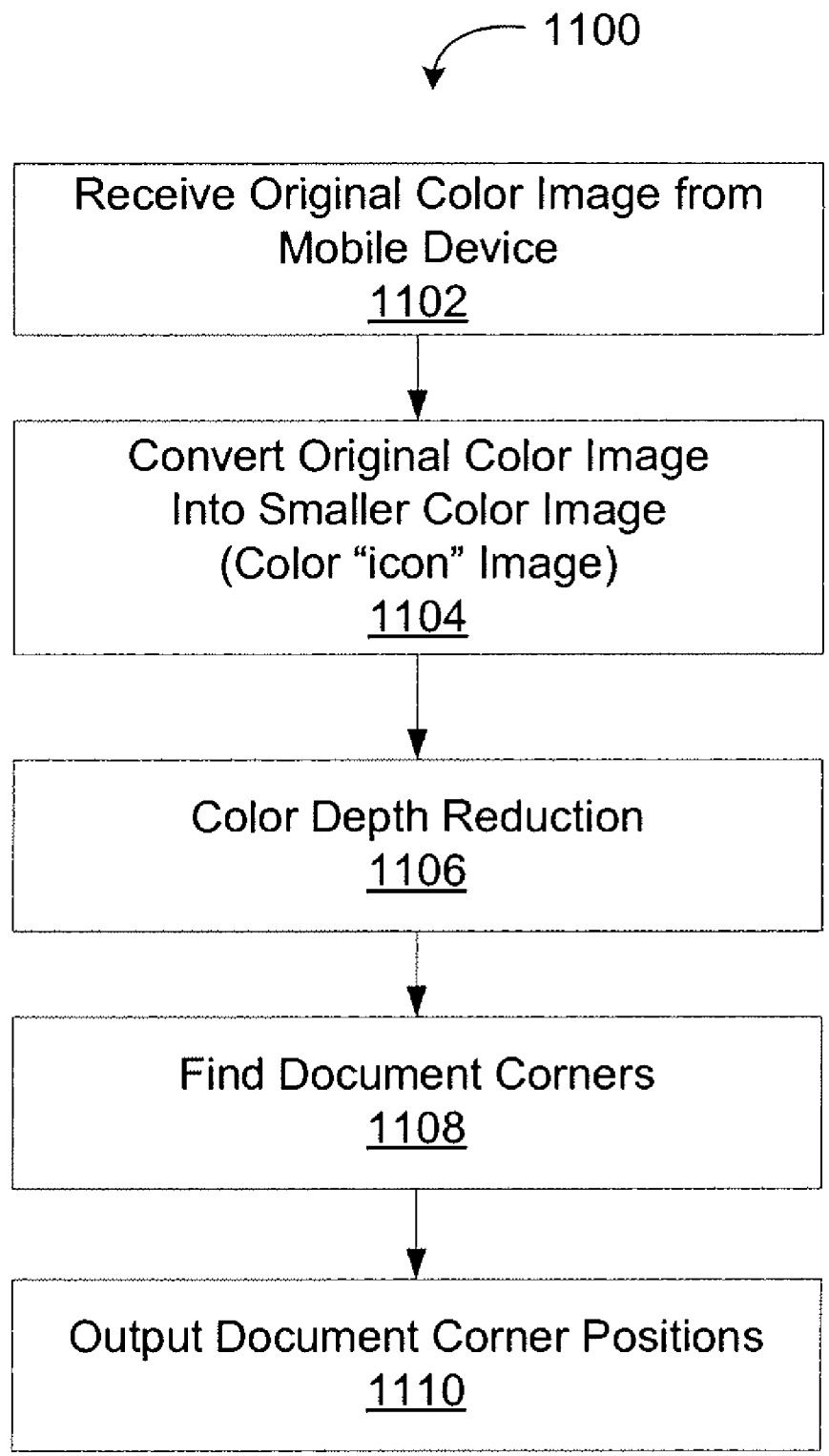
FIG. 11a is a flowchart illustrating an example method for automatic document detection within a color image from a mobile device in accordance with the systems and methods described herein.

Referring now to FIG. 11*a*, a flowchart is provided illustrating an example method 1100 for automatic document detection within a color image from a mobile device. Typically, the operations described within method 1100 are performed within an automatic document detection module, however, embodiments exist where the operations reside amongst multiple modules. In addition, generally the automatic document detection module takes a variety of factors into consideration when detecting the document in the mobile image. The automatic document detection module can take into consideration arbitrary location of the document within the mobile image, the 3-D distortions within the mobile image, the unknown size of the document, the unknown color of the document, the unknown color(s) of the background, and various other characteristics of the mobile engine (e.g. resolution, dimensions, etc.).

Method 1100 begins at operation 1102 by receiving the original color image from the mobile device. Upon receipt, this original color image is converted into a smaller color image, also referred to as a color "icon" image, at operation 1104. This color "icon" image preserves the color contrasts between the document and the background, while suppressing contrasts inside the document. A detailed description of the conversion process is provided with respect to FIG. 12*a*.

A color reduction operation is then applied to the color "icon" image at operation 1106. During the operation, the overall color of the image is reduced, while the contrast between the document and its background is preserved within the image. Specifically, the color "icon" image of operation 1104 is converted into a gray "icon" image (also known as a gray-scale "icon" image) having the same size. The color depth reduction process is described with further detail with respect to FIG. 13*a*.

Figure 11B:
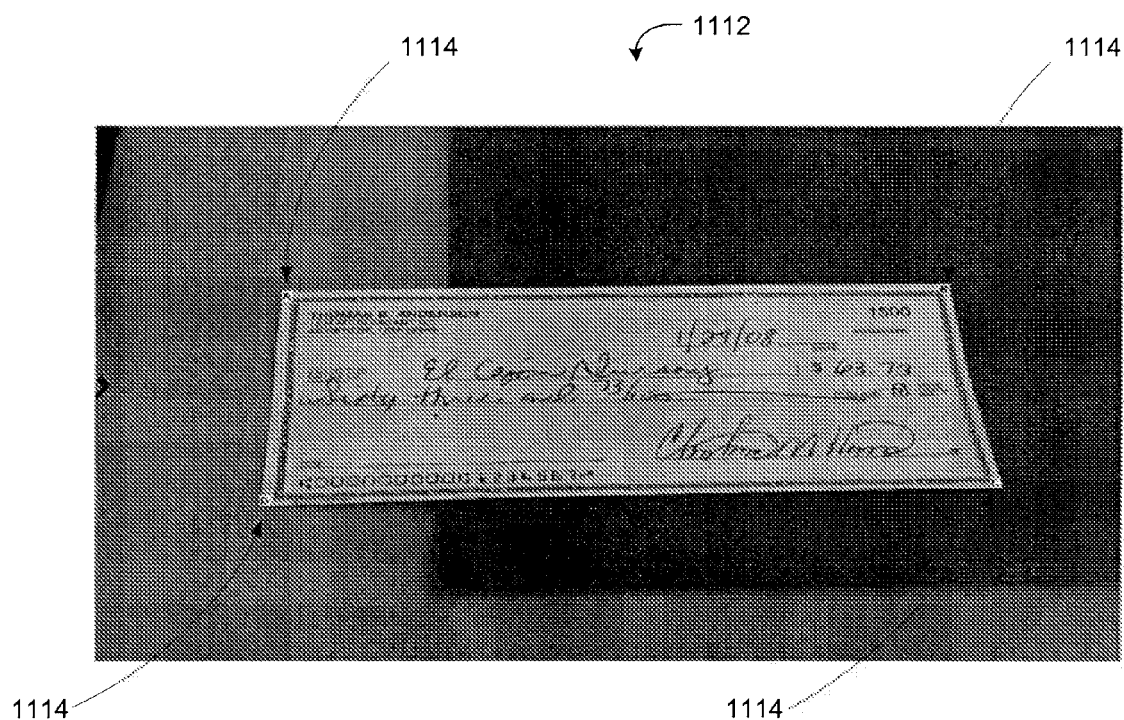
FIG. 11b is an example mobile image depicting a check where the corners have been detected in accordance with the systems and methods described herein.

Subsequently, method 1100 locates the corners of the document within the gray "icon" image at operation 1108. As previously noted in FIG. 6, these corners A, B, C, and D make up the quadrangle ABCD (e.g. quadrangle ABCD 502). Quadrangle ABCD, in turn, makes up the perimeter of the document. For example, FIG. 11*b* depicts a check 1112 in which corners 1114 are detected by operation 1108. Upon detection of the corners, the location of the corners is outputted at operation 1110.

Figure 12A:
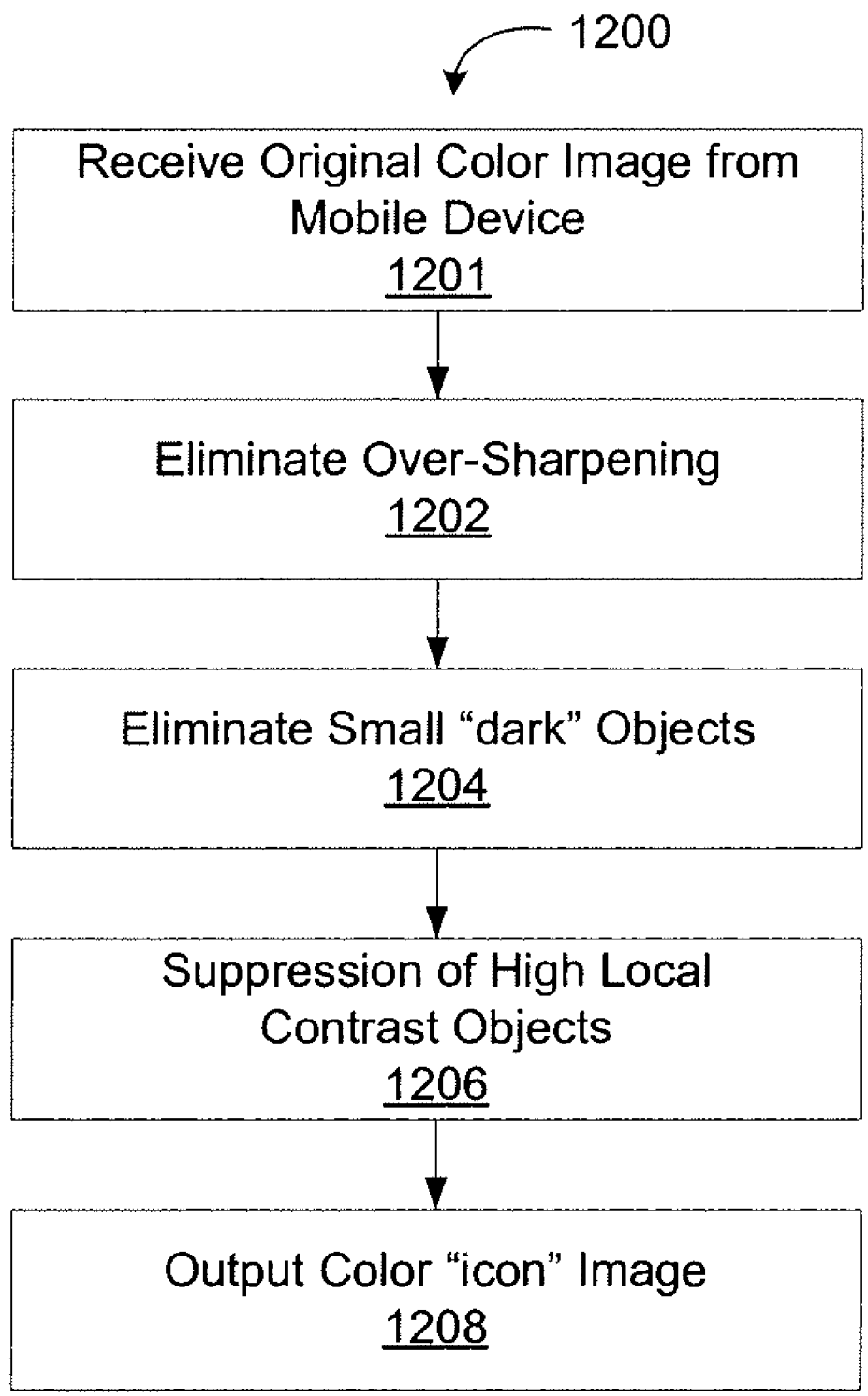
FIG. 12a is a flowchart illustrating an example method for converting a color image to a smaller "icon" image in accordance with the systems and methods described herein.

Referring now to FIG. 12*a*, a flowchart is provided describing an example method 1200 for conversion of a color image to a smaller "icon" image in accordance with the invention. The smaller "icon" image preserves the color contrasts between the document depicted therein and its background, while suppressing contrasts inside the document. Upon receipt of the original color image from the mobile device at operation 1201, the method 1200 eliminates over-sharpening within the image at operation 1202. Accordingly, assuming the color input image I has the dimensions of W×H pixels, operation 1202 averages the intensity of image I and downscales image I to image I', such that image I' has dimensions that are half that of image I (i.e. W'=W/2 and H'=H/2). Under certain embodiments, the color transformation formula can be described as the following:

$$C(p')=\text{ave}\{C(q): q \text{ in } S{\times}S\text{-window of } p\}, \text{ where} \quad (\text{eq. 5})$$

C is any of red, green or blue components of color intensity;
p' is any arbitrary pixel on image I' with coordinates (x',y');
p is a corresponding pixel on image I:p=p(x,y), where x=2*x' and y=2*y';
q is any pixel included into S×S-window centered in p;
S is established experimentally; and
ave is averaging over all q in the S×S-window.

At the next operation 1204, small "dark" objects within the image are eliminated. Examples of such small "dark" objects include, but are not limited to, machine-printed characters and hand-printed characters inside the document. Hence, assuming operation 1204 receives image I' from operation 1202, operation 1204 creates a new color image I" referred to as an "icon" with width W" set to a fixed small value and height H" set to W"*(H/W), thereby preserving the original aspect ratio of image I. In some embodiments, the transformation formula can be described as the following:

$$C(p'')=\max\{C(q'): q' \text{ in } S'{\times}S'\text{-window of } p'\}, \text{ where} \quad (\text{eq. 6})$$

C is any of red, green or blue components of color intensity;

p" is an arbitrary pixel on image I";

p' is a pixel on image I' which corresponds to p" under similarity transformation, as previously defined;

q' is any pixel on image I' included into S'×S'-window centered in p';

max is maximum over all q' in the S'×S'-window;

W" is established experimentally;

S' is established experimentally for computing the intensity I"; and

I"(p") is the intensity value defined by maximizing the intensity function I'(p') within the window of corresponding pixel p' on image I', separately for each color plane.

The reason for using the "maximum" rather than "average" is to make the "icon" whiter (white pixels have a RGB-value of (255,255,255)).

Figure 12B:
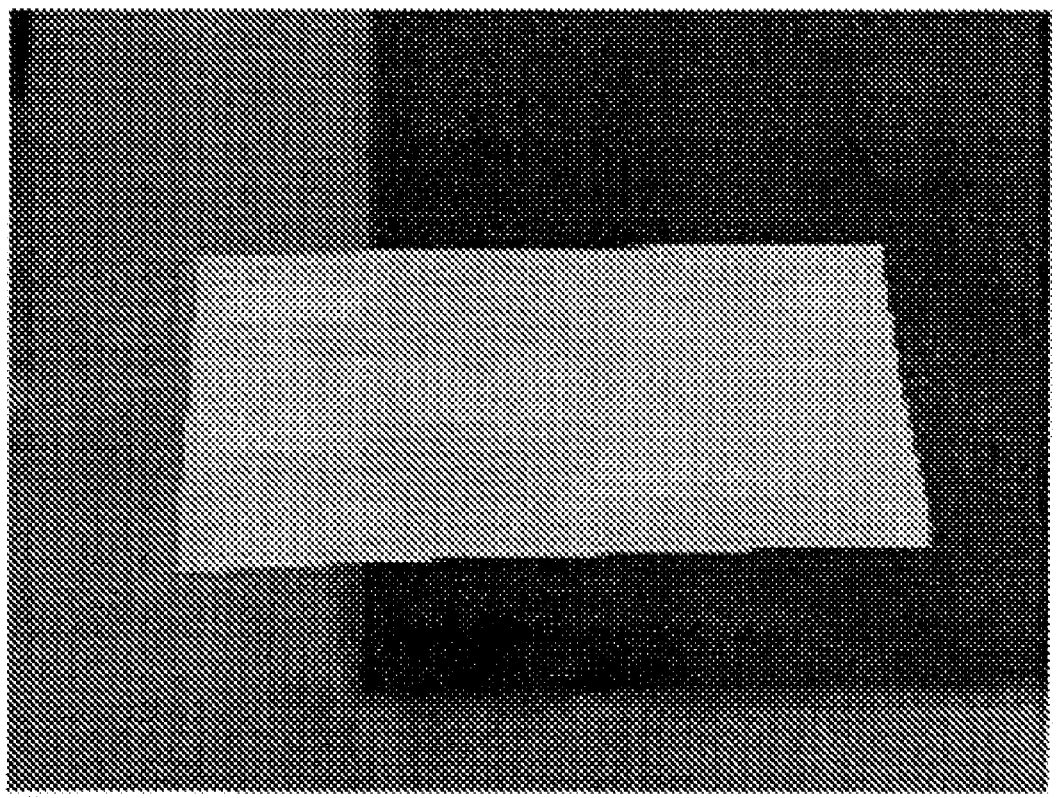
FIG. 12b is a mobile image depicting an example of the mobile image of FIG. 11b after being converted into a color "icon" image in accordance with the systems and methods described herein.

In the next operation 1206, the high local contrast of "small" objects, such as lines, text, and handwriting on a document, is suppressed, while the other object edges within the "icon" are preserved. Often, these other object edges are bold. In various embodiments of the invention, multiple dilation and erosion operations (also known as morphological image transformations) are utilized in the suppression of the high local contrast of "small" objects. Such morphological image transformations are commonly known and used by those of ordinary skill in the art. The sequence and amount of dilation and erosion operations used is determined experimentally. Subsequent to the suppression operation 1206, a color "icon" image is outputted at operation 1208. FIG. 12b depicts an example of the mobile image of FIG. 11b after being converted into a color "icon" image in accordance with one embodiment of the invention.

Figure 13A:
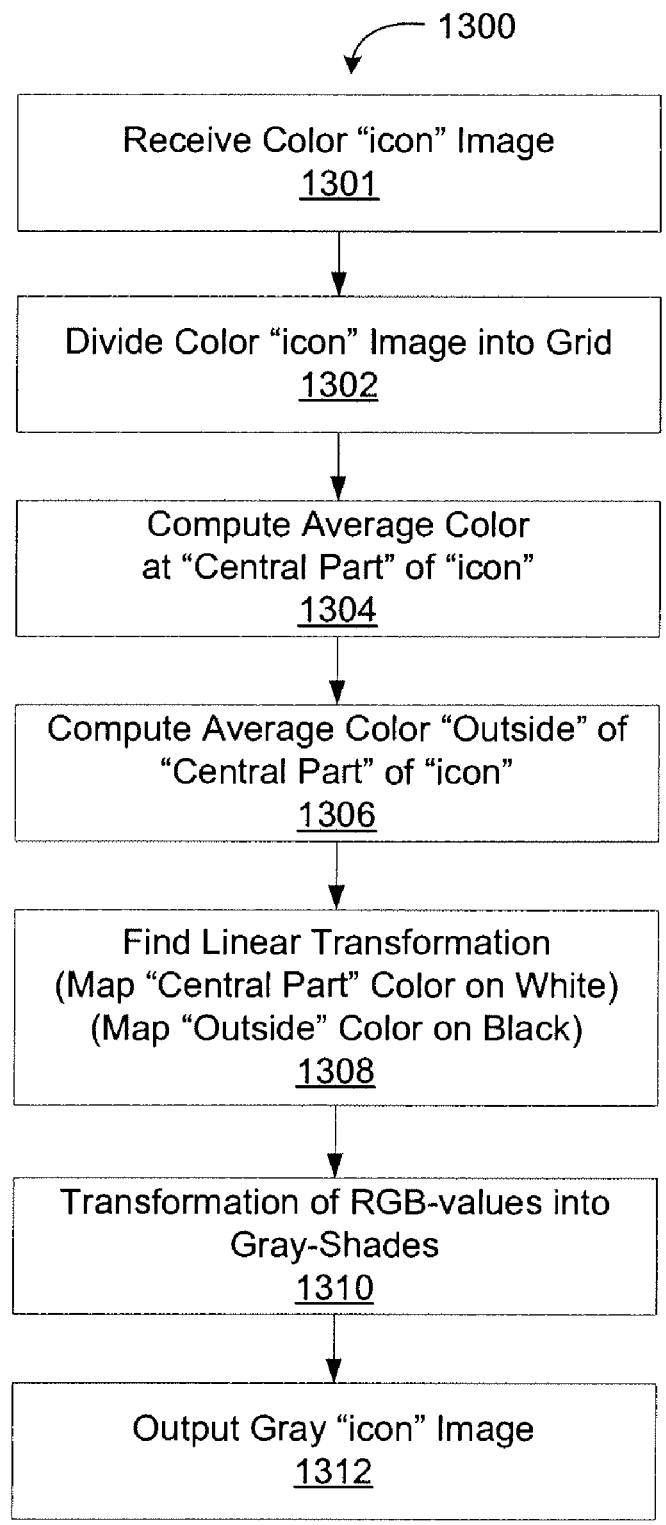
FIG. 13a is a flowchart illustrating an example method for color depth reduction in accordance with the systems and methods described herein.
Figure 13B:
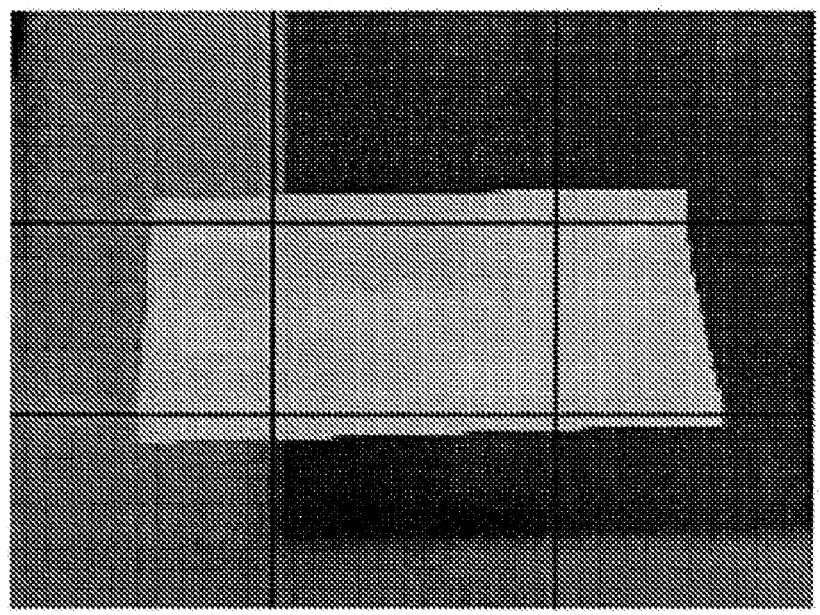
FIG. 13b is a mobile image depicting an example of the color "icon" image of FIG. 12b after a color depth reduction operation has divided it into a 3×3 grid in accordance with the systems and methods described herein.

Referring now to FIG. 13a, a flowchart is provided illustrating an example method 1300 that provides further details with respect to the color depth reduction operation 1106 as illustrated in FIG. 11a. At operation 1301, the method 1300 receives a color "icon" image for color reduction. The method divides the color "icon" image into a grid (or matrix) of fixed length and width with equal size grid elements at operation 1302. In some embodiments, the preferred grid size is such that there is a center grid element. For example, a grid size of 3×3 may be employed. FIG. 13b depicts an example of the color "icon" image of FIG. 12b after operation 1302 has divided it into a 3×3 grid in accordance with one embodiment of the invention.

Then, at operation 1304, the "central part" of the icon, which is usually the center most grid element, has its color averaged. Next, the method 1300 computes the average color of the remaining parts of the icon at operation 1306. More specifically, the grid elements "outside" the "central part" of the "icon" have their colors averaged. Usually, in instances where there is a central grid element (e.g. 3×3 grid), the "outside" of the "central part" comprises all the grid elements other than the central grid element.

Figure 13C:
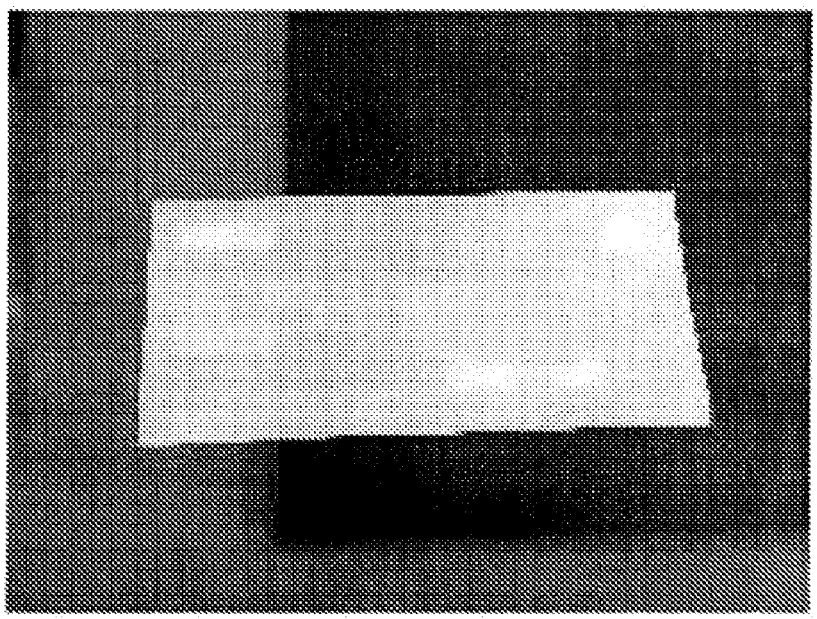
FIG. 13c is a mobile image depicting an example of the of the color "icon" image of FIG. 12b once it has been converted to a gray "icon" image by a color depth reduction operation in accordance with the systems and methods described herein.

Subsequently, method 1300 determines a linear transformation for the RGB-space at operation 1308. The linear transformation is defined such that it maps the average color of the "central part" computed during operation 1304 to white (i.e. 255), while the average color of the "outside" computed during operation 1306 maps to black (i.e. 0). All remaining colors are linearly mapped to a shade of gray. This linear transformation, once determined, is used at operation 1310 to transform all RGB-values from the color "icon" to a gray-scale "icon" image, which is then outputted at operation 1312. Within particular embodiments, the resulting gray "icon" image (also referred to as a gray-scale "icon" image) maximizes the contrast between the document background (assuming that the document is located close to the center of the image) and the background. FIG. 13c depicts an example of the color "icon" image of FIG. 12b once it has been converted to a gray "icon" image in accordance with one embodiment of the invention.

Figure 14:
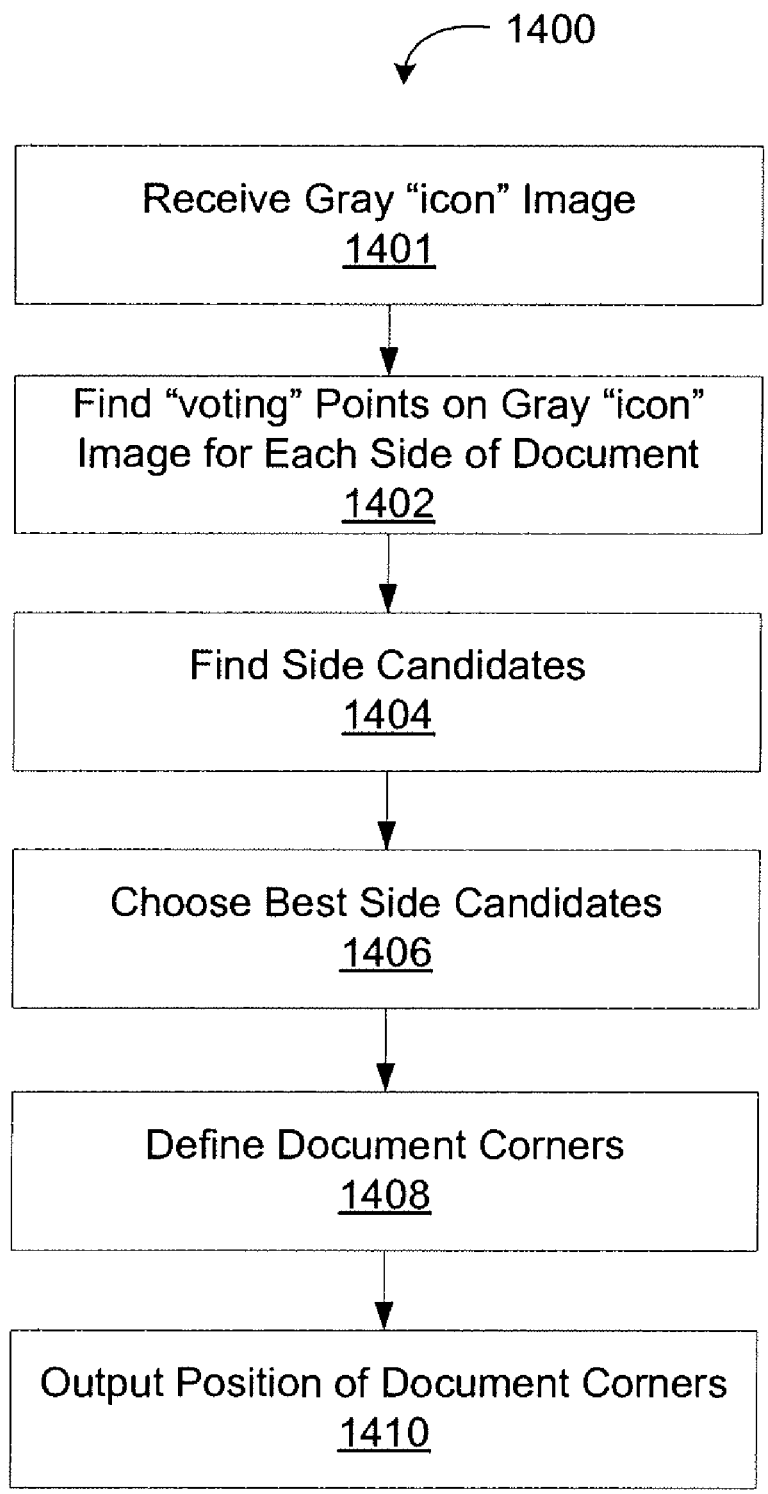
FIG. 14 is a flowchart illustrating an example method for finding document corners from a gray "icon" image in accordance with the systems and methods described herein.

Referring now to FIG. 14, a flowchart is provided illustrating an example method 1400 for finding document corners from a gray "icon" image containing a document. Upon receiving a gray "icon" image at operation 1401, method proceeds to operation 1402 by finding the "voting" points on the gray "icon" image for each side of the document depicted in the image. Consequently, operation 1402 finds all positions on the gray "icon" image which could be approximated with straight line segments to represent left, top, right, and bottom sides of the document.

In accordance with one embodiment, operation 1402 achieves its goal by first looking for the "voting" points in the half of the "icon" that corresponds with the current side of interest. For instance, if the current side of interest is the document's top side, the upper part of the "icon" (Y<H/2) is examined while the bottom part of the "icon" (Y≥H/2) is ignored.

Within the selected half of the "icon," operation 1402 would then compute the intensity gradient (contrast) in the correct direction of each pixel. This is accomplished in some embodiments by considering a small window centered in the pixel and, then, breaking the window into an expected "background" half where the gray intensity is smaller (i.e. where it is supposed to be darker) and into an expected "doc" half where the gray intensity is higher (i.e. where it is supposed to be whiter). There is a break line between the two halves, either horizontal or vertical depending on side of the document sought to be found. Next the average gray intensity in each half-window is computed, resulting in an average image intensity for the "background" and an average image intensity of the "doc." The intensity gradient of the pixel is calculated by subtracting the average image intensity for the "background" from the average image intensity for the "doc."

Eventually, those pixels with sufficient gray intensity gradient in the correct direction are marked as "voting" points for the selected side. The sufficiency of the actual gray intensity gradient threshold for determining is established experimentally.

Continuing with method 1400, operation 1404 finds candidate sides (i.e. line segments) that potentially represent the sides of the document (i.e. left, top, right, and bottom sides). In order to do so, some embodiments find all subsets within the "voting" points determined in operation 1402 which could be approximated by a straight line segment (linear approximation). In many embodiments, the threshold for linear approximation is established experimentally. This subset of lines is defined as the side "candidates." As an assurance that the set of side candidates is never empty, the gray "icon" image's corresponding top, bottom, left, and right sides are also added to the set.

Next, operation 1406 chooses the best candidate for each side of the document from the set of candidates selected in operation 1404, thereby defining the position of the document within the gray "icon" image. In accordance with the invention, some embodiments use the following process in choosing the best candidate for each side of the document.

The process starts by selecting a quadruple of line segments {L, T, R, B}, where L is one of the candidates for the left side of the document, T is one of the candidates for the top side of the document, R is one of the candidates for the right side of the document, and B is one of the candidates for the bottom side of the document. The process then measures the following characteristics for the quadruple currently selected.

The amount of "voting" points is approximated and measured for all line segments for all four sides. This amount value is based on the assumption that the document's sides are linear and there is a significant color contrast along them. The larger values of this characteristic increase the overall quadruple rank.

The sum of all intensity gradients over all voting points of all line segments is measured. This sum value is also based on the assumption that the document's sides are linear and there is a significant color contrast along them. Again, the larger values of this characteristic increase the overall quadruple rank.

The total length of the segments is measured. This length value is based on the assumption that the document occupies a large portion of the image. Again, the larger values of this characteristic increase the overall quadruple rank.

The maximum of gaps in each corner is measured. For example, the gap in the left/top corner is defined by the distance between the uppermost point in the L-segment and the leftmost point in the T-segment. This maximum value is based on how well the side-candidates suit the assumption that the document's shape is quadrangle. The smaller values of this characteristic increase the overall quadruple rank.

The maximum of two angles between opposite segments (i.e. between L and R, and between T and R) is measured. This maximum value is based on how well the side-candidates suit the assumption that the document's shape is close to parallelogram. The smaller values of this characteristic increase the overall quadruple rank.

The deviation of the quadruple's aspect ratio from the "ideal" document aspect ratio is measured. This characteristic is applicable to documents with a known aspect ratio, e.g. checks. If the aspect ratio is unknown, this characteristic should be excluded from computing the quadruple's rank. The quadruple's aspect ratio is computed as follows:
  a) Find the quadrangle by intersecting the quadruple's elements;
  b) Find middle-point of each of the four quadrangle's sides;
  c) Compute distances between middle-points of opposite sides, say D1 and D2;
  d) Find the larger of the two ratios: R=max(D1/D2, D2/D1);
  e) Assuming that the "ideal" document's aspect ratio is known and Min/MaxAspectRatio represent minimum and maximum of the aspect ratio respectively, define the deviation in question as:
    0, if MinAspectRatio<=R<=MaxAspectRatio
    MinAspectRatio–R, if R<MinAspectRatio
    R–MaxAspectRatio, if R>MaxAspectRatio.

For checks, MinAspectRatio can be set to 2.0 and MaxAspectRatio can be set to 3.0. This aspect ratio value is based on the assumption that the document's shape is somewhat preserved during the perspective transformation. The smaller values of this characteristic increase the overall quadruple rank.

Following the measurement of the characteristics of the quadruple noted above, the quadruple characteristics are combined into a single value, called the quadruple rank, using weighted linear combination. Positive weights are assigned for the amount of "voting" points, the sum all of intensity gradients, and the total length of the segments. Negatives weights are assigned for maximum gaps in each corner, maximum two angles between opposite segments, and the deviation of the quadruple's aspect ratio. The exact values of each of the weights are established experimentally.

The operations set forth above are repeated for all possible combinations of side candidates, eventually leading to the "best" quadruple, which is the quadruple with the highest rank. The document's corners are defined as intersections of the "best" quadruple's sides (i.e. the best side candidates).

Operation 1408 subsequently defines the corners of the document using the intersections of the best side candidates. A person of ordinary skill in the art would appreciate that these corners can then be located on the original mobile image by transforming the corner locations found on the "icon" using the similarity transformation previously mentioned. Method 1400 concludes at operation 1410 by outputting the locations of the corners defined in operation 1408.

Figure 15A:
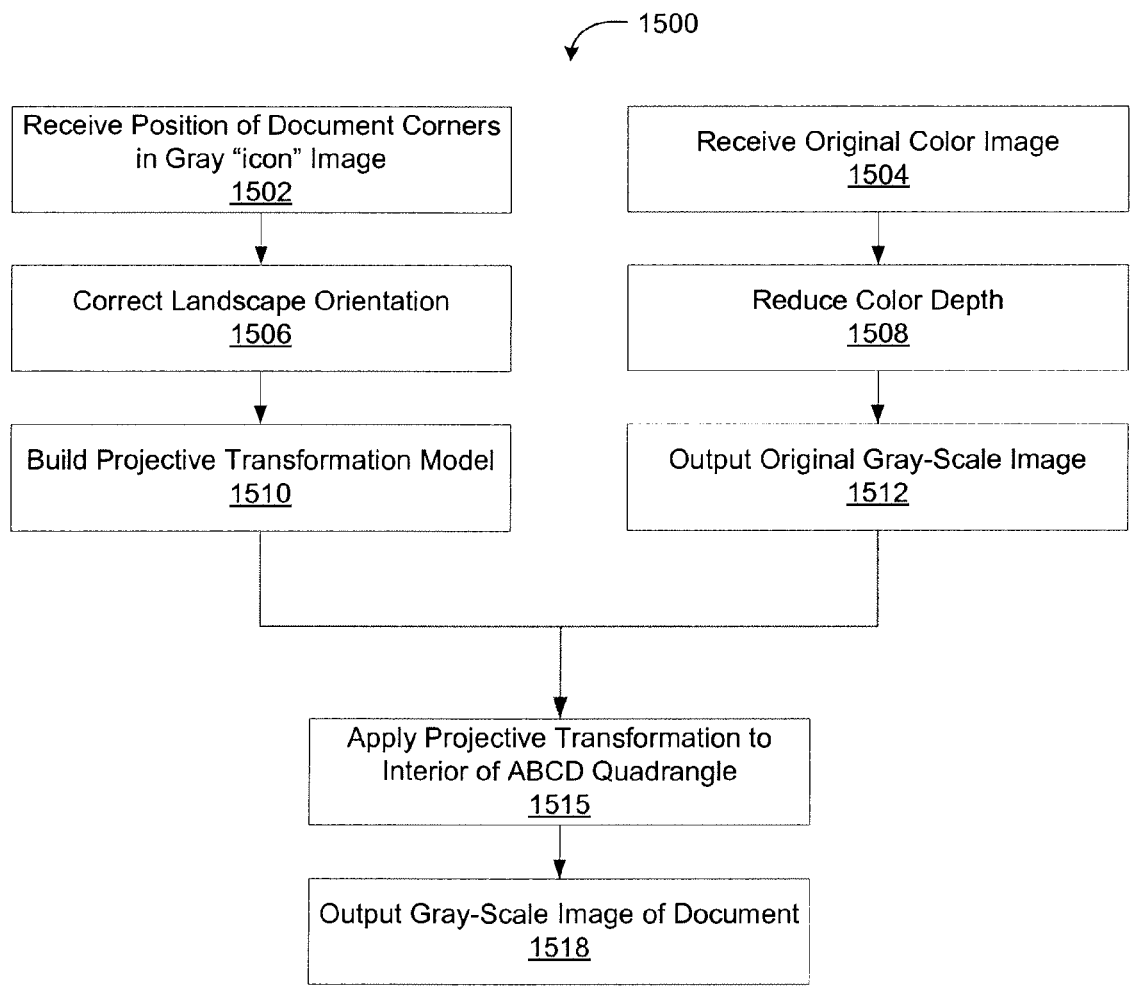
FIG. 15a is a flowchart illustrating an example method for geometric correction in accordance with the systems and methods described herein.

With respect to the geometrical correction operation described in operation 1004 of FIG. 10, FIG. 15a provides a flowchart that illustrates an example method 1600 for geometric correction in accordance with the invention. As previously mentioned, geometric correction is needed to correct any possibly perspective distortions that exist in the original mobile image. Additionally, geometric correction can correct the orientation of the documentation within the original mobile image (e.g. document is orientated at 90, 180, or 270 degrees where the right-side-up orientation is 0 degrees). It should be noted that in some embodiments, the orientation of the document depends on the type of document depicted in the mobile image, as well as the fields of relevance on the document.

Figure 15B:
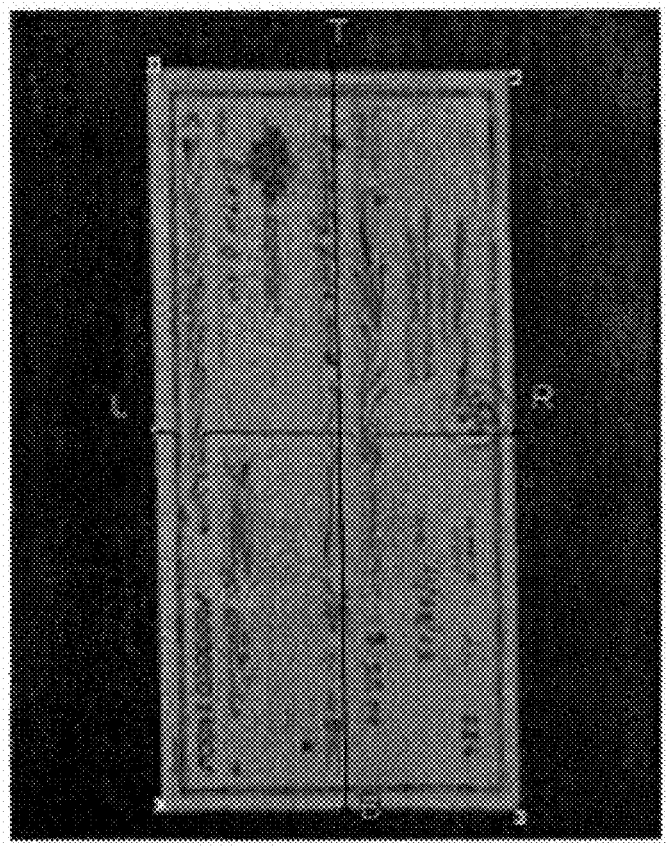
FIG. 15b is an example mobile image depicting a check in landscape orientation.

In instances where the document is in landscape orientation (90 or 270 degrees), as illustrated by the check in FIG. 15b, geometric correction is suitable for correcting the orientation of the document. Where the document is at 180 degree orientation, detection of the 180 degree orientation and its subsequent correction are suitable when attempting to locate an object of relevance on the document that is known to be at a specific location. For example, an MICR-line on a document can be one relevant object since the MICR-line is usually located at a specific location on such documents. Hence, where the financial document is a check, the MICR-line may function as the relevant object (since it is consistently located at the bottom of the check) to determine the current orientation of the check within the mobile image. In some embodiments, the object of relevance on a document depends on the document's type. For example, where the document is a contract, the object of relevance may be a notary seal, signature, or watermark positioned at a known position on the contract. Greater detail regarding correction of a document (specifically, a check) having upside-down orientation (180 degree orientation) is provided with respect to FIG. 17a.

According to some embodiments of the invention, a mathematical model of projective transformations is built and converts the distorted image into a rectangle-shaped image of predefined size. For instance, where the document depicted in mobile image is a check, the predefined size is established as 1200×560 pixels, which is roughly equivalent to the dimensions of a personal check scanned at 200 DPI.

Continuing with reference to method 1500, there are two separate paths of operations that are either performed sequentially or concurrently, the outputs of which are eventually utilized in the final output of method 1500. One path of operations begins at operation 1504 where method 1500 receives the original mobile image in color. Operation 1508 then reduces the color depth of the original mobile image from a color image with 24 bit per a pixel (24 bit/pixel) to a gray-scale image with 8 bit per a pixel (8 bit/pixel). This image is subsequently outputted to operation 1516 by operation 1512.

The other path of operations begins at operation 1502, where method 1500 receives the positions of the document's corners within the gray "icon" image produced by method 1300. Based off the location of the corners, operation 1506 then determines the orientation of the document and corrects the orientation. In some embodiments, this operation uses the corner locations to measure the aspect ratio of the document within the original image. Subsequently, operation 1506 finds a middle-point between each set of corners, wherein each set of corners corresponds to one of the four sides of the depicted document, resulting in the left (L), top (T), right (R), and bottom (B) middle-points. The distance between the L to R middle-points and the T to B middle points are then compared to determine which of the two pairs has the larger distance. This provides operation 1506 with the orientation of the document.

In some instances, the correct orientation of the document depends on the type of document that is detected. For example, as illustrated in FIG. 15b, where the document of interest is a check, the document is determined to be in landscape orientation when the distance between the top middle-point and bottom middle-point is larger than the distance between the left middle-point and the right middle-point. The opposite might be true for other types of documents.

If operation 1506 determines an orientation correction is necessary, the corners of the document are shifted in a loop, clock-wise in some embodiments and counter-clockwise in other embodiments.

At operation 1510, method 1500 builds the projective transformation to map the image of the document to a pre-defined target image size of width of W pixels and height of H pixels. In some embodiments, the projective transformation maps the corners A, B, C, and D of the document as follows: corner A to (0,0), corner B to (W,0), corner C to (W,H), and corner D to (0,H). Algorithms for building projective transformation are commonly known and used amongst those of ordinary skill in the art.

Figure 15C:
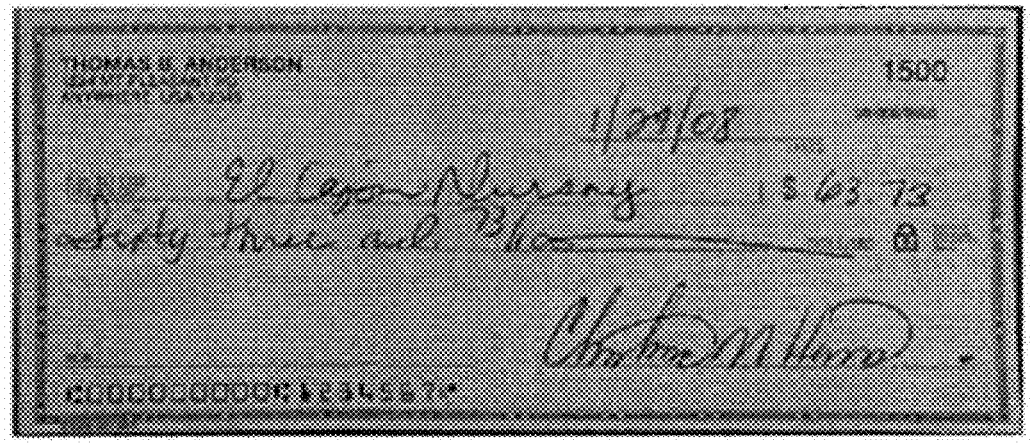
FIG. 15c is a mobile image depicting an example of the mobile image of FIG. 11b after a geometric correction operation in accordance with the systems and methods described herein.

At operation 1516, the projective transformation created during operation 1514 is applied to the mobile image in gray-scale as outputted from operation 1512. The projective transformation as applied to the gray-scale image of operation 1512 results in all the pixels within the quadrangle ABCD depicted in the gray-scale image mapping to a geometrically corrected, gray-scale image of the document alone. FIG. 15c is an example gray-scale image of the document depicted in FIG. 11b once a geometrical correction operation in accordance with the invention is applied thereto. Method 1500 concludes at operation 1518 where the gray-scale image of the document is outputted to the next operation in the invention.

Figure 16A:
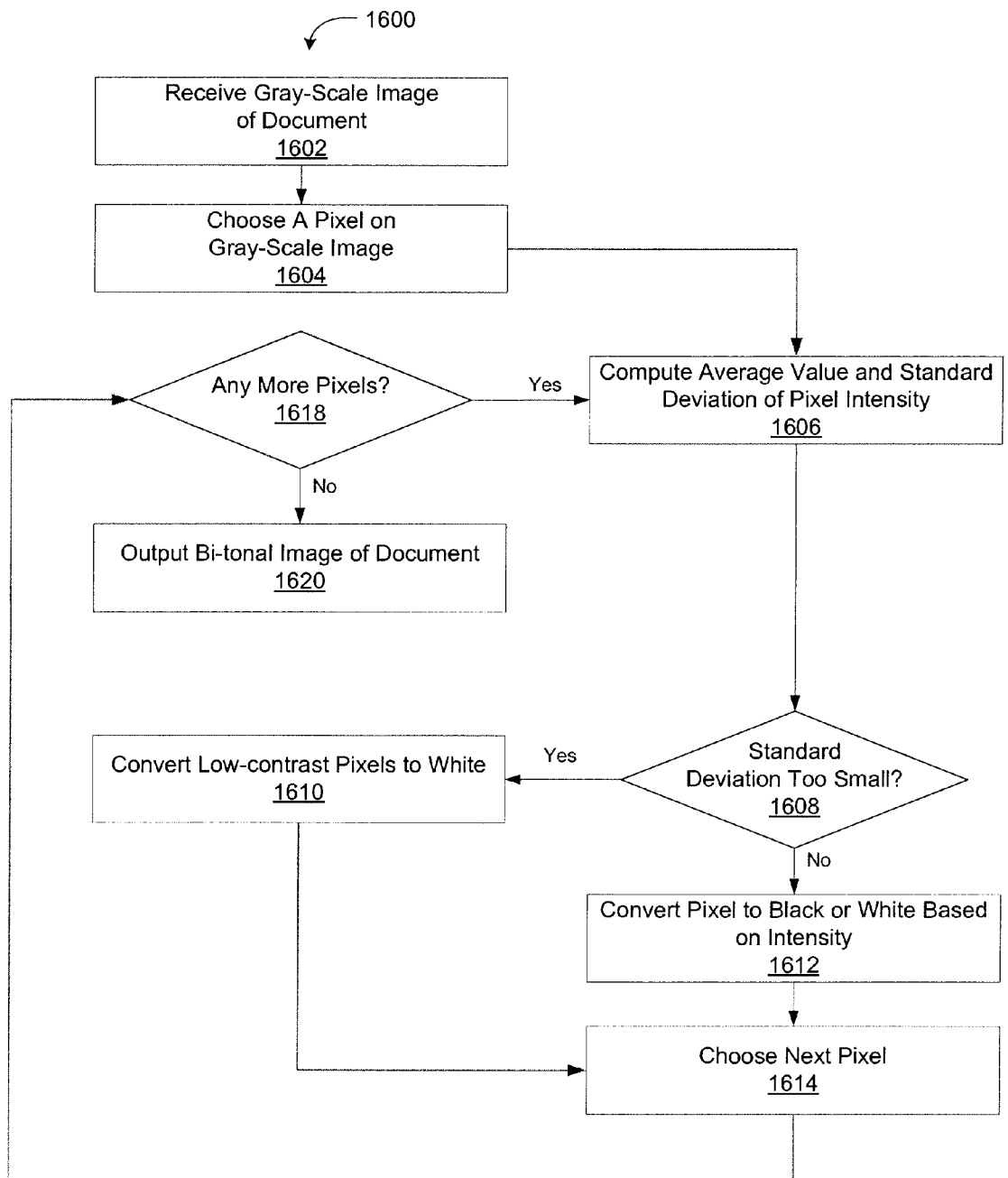
FIG. 16a is a flowchart illustrating an example method for binarization in accordance with the systems and methods described herein.

Now with respect to the binarization operation described in operation 1006 of FIG. 10, a flowchart illustrating an example method 1600 for binarization is provided in FIG. 16a. A binarization operation generates a bi-tonal image with color depth of 1 bit per a pixel (1 bit/pixel). In the case of financial documents, such as checks and deposit coupons, a bi-tonal image is required for processing by automated systems, such as Remote Deposit systems. In addition, many image processing engines require such an image as input. Method 1600 illustrates how one embodiment of the invention achieves the binarization of a gray-scale image of a document as produced by geometrical operation 1004. This particular embodiment uses a novel variation of well-known Niblack's method of binarization. As such, there is an assumption that the gray-scale image received has a the dimensions W pixel×H pixels and an intensity function I(x,y) gives the intensity of a pixel at location (x,y) in terms one of 256 possible gray-shade values (8 bit/pixel). The binarization operation will convert the 256 gray-shade value to a 2 shade value (1 bit/pixel), using an intensity function B(x,y). In addition, to apply the method, a sliding window with dimensions w pixels×h pixels is defined and a threshold T for local (in-window) standard deviation of gray image intensity I(x,y) is defined. The values of w, h, and T are all experimentally determined.

Once method 1600 receives the gray-scale image of the document at operation 1602, the method 1600 chooses a pixel p(x,y) within the image at operation 1604. The method 1600 computes the average (mean) value ave and standard deviation $\sigma$ of the chosen pixel's intensity I(x,y) within the w×h current window location (neighborhood) of pixel p(x,y) at operation 1606. If the standard deviation $\sigma$ is determined to be too small at operation 1608 (i.e. $\sigma<T$), pixel p(x,y) is considered to be low-contrast and, thus, part of the background. Accordingly, at operation 1610, low-contrast pixels are converted to white (i.e. B(x,y) is set to 1, which is white). However, if the deviation $\sigma$ is determined to be larger or equal to the threshold T (i.e. $\sigma \geq T$), the pixel p(x,y) is considered to be part of the foreground or background depending on its intensity. In operation 1612, if $I(p)<ave-k*\sigma$, pixel p is considered to be a foreground pixel and therefore B(x,y) is set to 0 (black). Otherwise, the pixel is treated as background (and therefore B(x,y) is set to 1). In the formula above, k is an experimentally established coefficient.

Figure 16B:
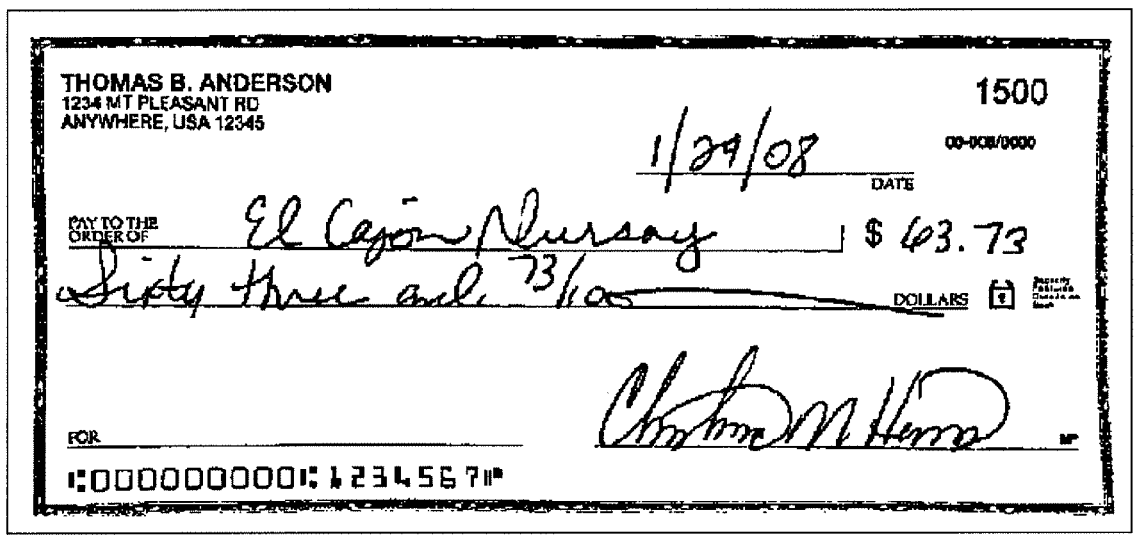
FIG. 16b is a mobile image depicting an example of the mobile image of FIG. 15c after it has been converted to a bi-tonal image by a binarization operation in accordance with the systems and methods described herein.

Subsequent to the conversion of the pixel at either operation 1610 or operation 1612, the next pixel is chosen at operation 1614, and operation 1606 is repeated until all the gray-scale pixels (8 bit/pixel) are converted to a bi-tonal pixel (1 bit/pixel). However, if no more pixels remain to be converted 1618, the bi-tonal image of the document is then outputted at operation 1620. FIG. 16b illustrates an example image of the check illustrated in FIG. 15c subsequent to a binarization operation in accordance with the invention.

Figure 17A:
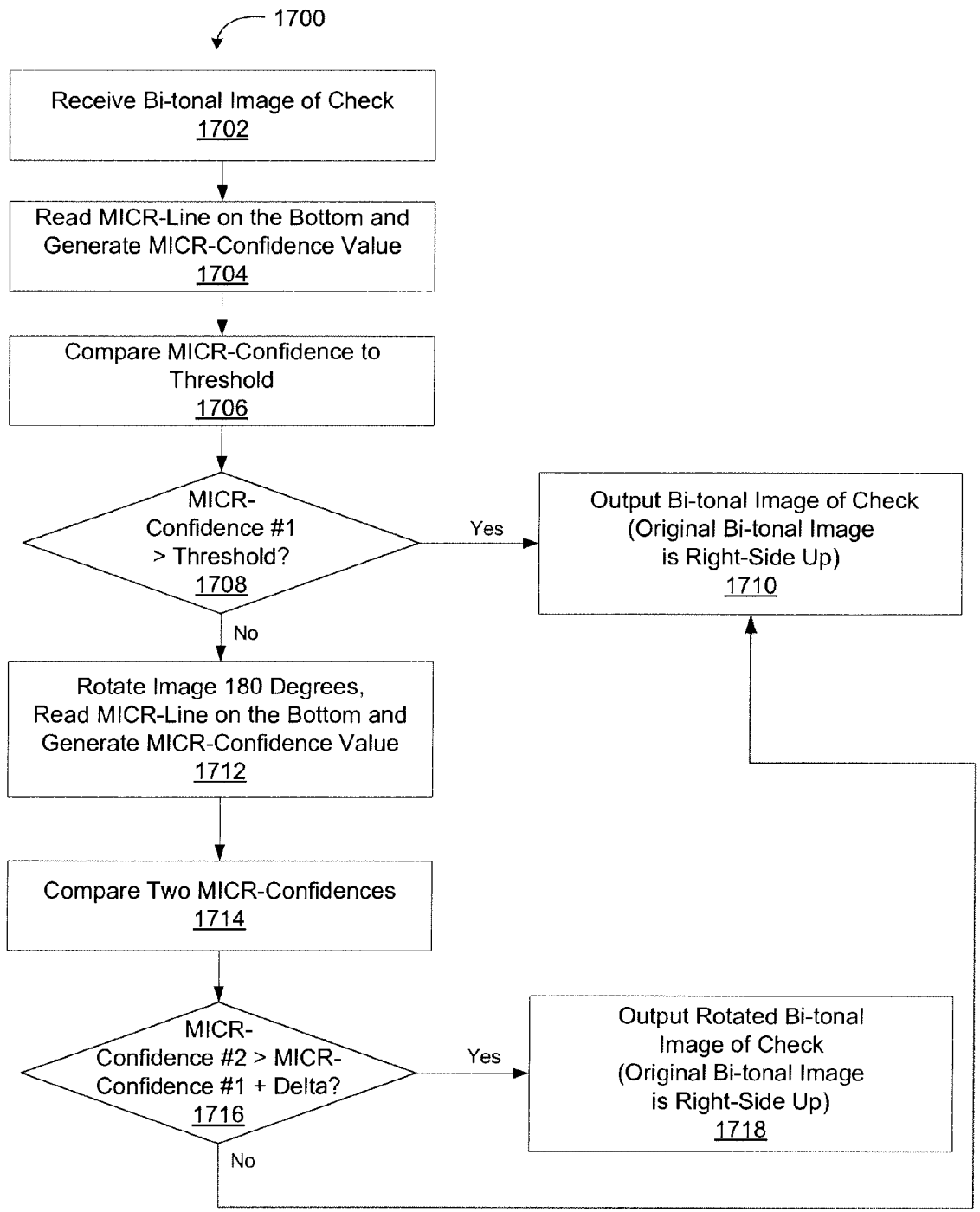
FIG. 17a is a flowchart illustrating an example method for correcting the upside-down orientation of a document within a mobile image in accordance with the systems and methods described herein.
Figure 17B:
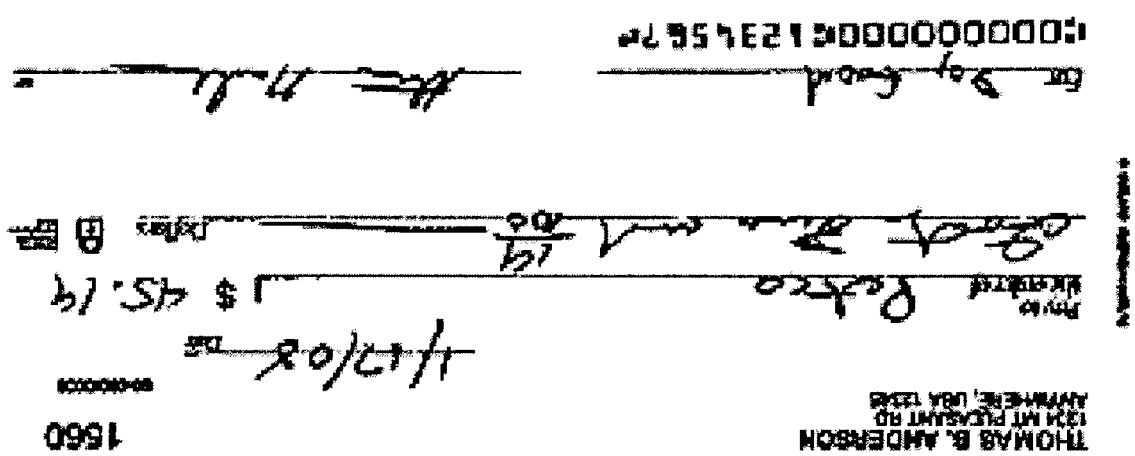
FIG. 17b is an example bi-tonal image depicting a check in an upside-down orientation.

With respect to the orientation correction operation 1008 previously described in FIG. 10, FIG. 17a provides a flowchart illustrating an example method for correcting the upside-down orientation of a document within an image. Specifically, FIG. 17a illustrates an example method 1700, in accordance with the invention, for correcting the upside-down orientation of a check within a bi-tonal image. FIG. 17b depicts an example bi-tonal image of a check in an upside-down orientation. A person of ordinary skill in the art would understand and appreciate that method 1700, in accordance with the present invention, could operate differently for other types of documents (e.g. deposit coupons).

As previously noted, the geometric correction operation as described in FIG. 15 is one method in accordance with the invention for correcting a document having landscape orientation within the mobile image. However, even after the landscape orientation correction, the document still may remain in upside-down orientation. In order to the correct upside-down orientation for certain documents, some embodiments of the invention require the image containing the document be binarized beforehand. Hence, the orientation correction operation 1008 as illustrated in FIG. 10 usually follows the binarization operation of 1006.

Upon receiving the bi-tonal image of the check at operation 1702, method 1700 reads the MICR-line at the bottom of the bi-tonal check image at operation 1704 and generates an MICR-confidence value. This MICR-confidence value (MC1) is compared to a threshold value T at operation 1706 to determine whether the check is right-side-up. If MC1>T at operation 1708, then the bi-tonal image of the check is right side up and is outputted at operation 1710.

However, if MC1≦T at operation 1708, the image is rotated 180 degrees at operation 1712, the MICR-line at the bottom read again, and a new MICR-confidence value generated (MC2). The rotation of the image by 180 degree is done by methods commonly-known in the art. The MICR-confidence value after rotation (MC2) is compared to the previous MICR-confidence value (MC1) plus a Delta at operation 1714 to determine if the check is now right-side-up. If MC2>MC2+Delta at operation 1716, the rotated bi-tonal image has the check right-side-up and, thus, the rotated image is outputted at operation 1718. Otherwise, if MC2≦MC2+Delta at operation 1716, the original bi-tonal image of the check is right-side-up and outputted at operation 1710. Delta is a positive value selected experimentally that reflects a higher apriori probability of the document initially being right-side-up than upside-down.

Figure 18:
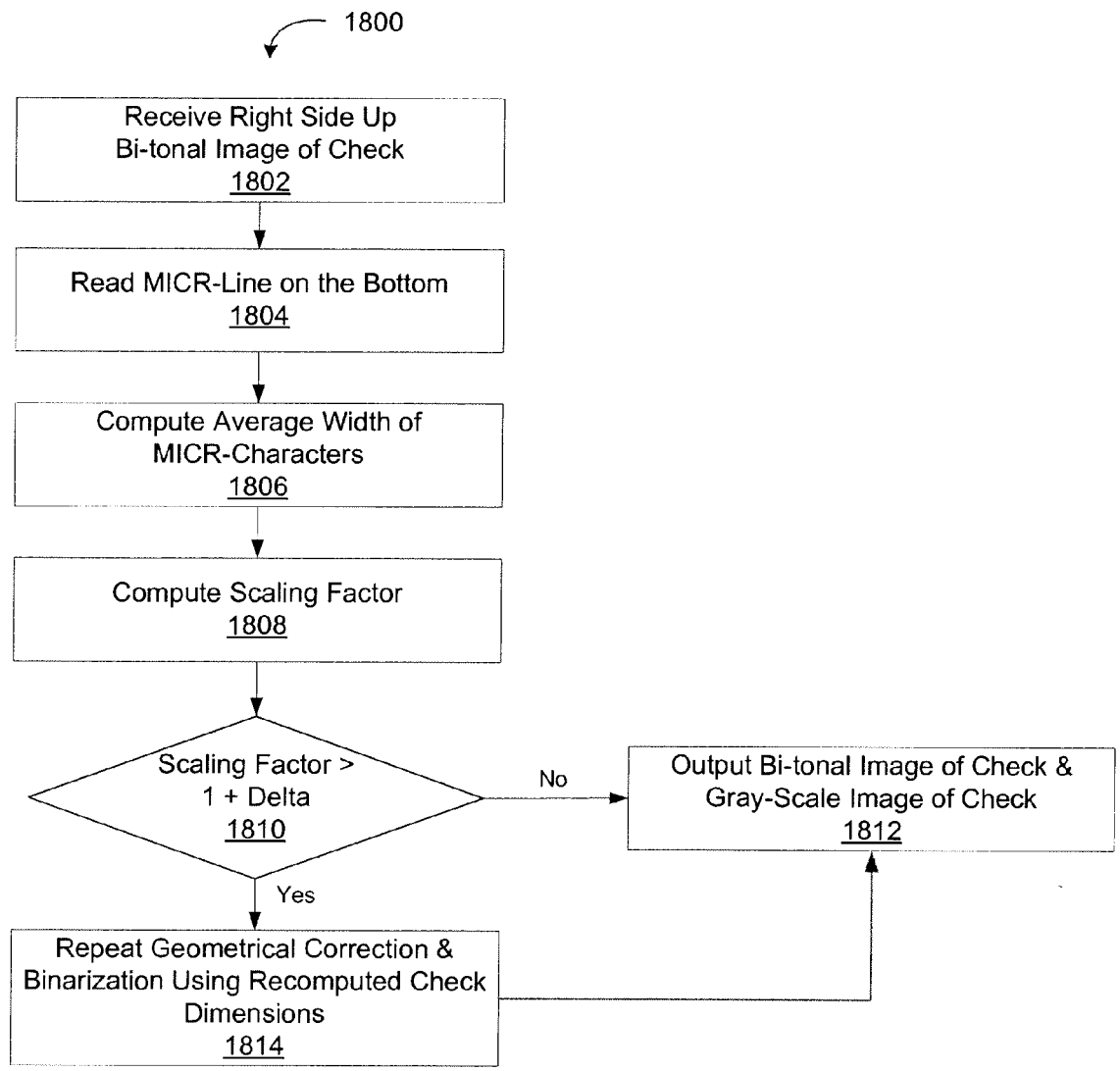
FIG. 18 is a flowchart illustrating an example method for size correction of an image in accordance with the systems and methods described herein.

With respect to the size correction operation 1010 illustrated in FIG. 10, FIG. 18 provides a flowchart illustrating an example method for size correction of an image in accordance with the invention. Specifically, FIG. 18 illustrates an example method 1800, in accordance with the invention, for correcting the size of a check within a bi-tonal image, where the check is oriented right-side-up. A person of ordinary skill in the art would understand and appreciate that method 1800, in accordance with the present invention, could operate differently for other types of documents (e.g. deposit coupons).

Since many image processing engines are sensitive to image size, it is crucial that the size of the document image be corrected before it can be properly processed. For example, a form identification engine may rely on the document size as an important characteristic for identifying the type of document that is being processed. Generally, for documents such as checks, the image size should be equivalent to the image size produced by a standard scanner running at 200 DPI.

In addition, where the document is a check, during the geometric correction operation of some embodiments of the invention, the geometrically corrected predefined image size is at 1200×560 pixels (See, for e.g., FIG. 15 description), which is roughly equivalent to the size of a personal check scanned at 200 DPI. However, the size of business checks tend to vary significantly, with most business checks having a width greater than 1200 pixels when scanned at 200 DPI. Some business checks are known to be as wide as 8.75", which translates to be 1750 pixels in width when scanned at 200 DPI. Hence, in order to restore the size of business checks that have been geometrically corrected in accordance with the invention at a predefined image size of 1200×560 pixels, the size correction operation is performed.

Referring now to FIG. 18, after receiving a bi-tonal image containing a check that is orientated right-side-up at operation 1802, method 1800 reads the MICR-line at the bottom of the check at operation 1804. This allows method 1800 to compute the average width of the MICR-characters at operation 1806. In doing so, the computer average width gets compared to the average size of an MICR-character at 200 DPI at operation 1808, and a scaling factor is computed accordingly. In some embodiments of the invention, the scaling factor SF is computer as follows:

$$SF = AW_{200}/AW, \text{ where} \qquad (eq. 7)$$

AW is the average width of the MICR-character found; and
$AW_{200}$ is the corresponding "theoretical" value based on the ANSIx9.37 standard (Specifications for Electronic Exchange of Check and Image Data) at 200 DPI.

Method 1800 uses the scaling factor at operation 1810 to determine whether the bi-tonal image of the check requires size correction. If the scaling SF is determined to be less than or equal to 1.0+Delta, then method 1800 outputs the most recent versions of the check's bi-tonal image and the check's the gray-scale image at operation 1812. Delta defines the system's tolerance to wrong image size.

If, however, the scaling factor SF is determined to be higher than 1.0+Delta, then at operation 1814 the new dimensions of the check are computed as follows:

$$AR = H_S/W_S \qquad (eq. 8)$$

$$W' = W*SF \qquad (eq. 9)$$

$$H' = AR*W', \text{ where} \qquad (eq. 10)$$

$H_S$ and $W_S$ are the height and width of the check snippet found on the original image;
AR is the check aspect ratio which we want to maintain while changing the size;
W is the width of geometrically corrected image before it's size is adjusted;
W' is the adjusted check's width in pixels; and
H' is the adjusted check's height in pixels.

Subsequent to re-computing the new dimensions, operation 1814 repeats geometrical correction and binarization using the newly dimensioned check image. Following the repeated operations, operation 1812 outputs the resulting bi-tonal image of the check and gray-scale image of the check.

Figure 19:
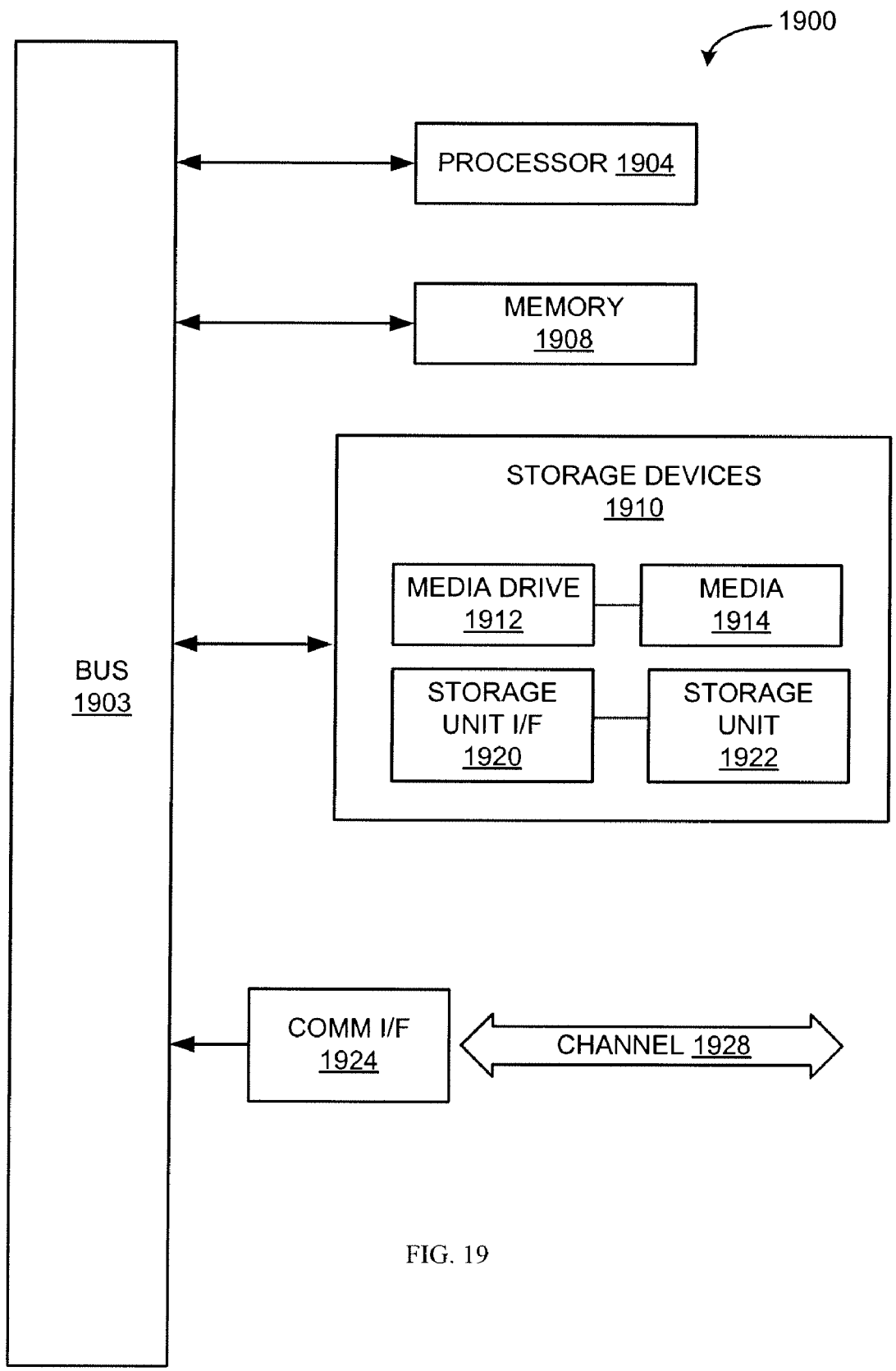
FIG. 19 is a simplified block diagram illustrating an example-computing module in accordance with one embodiment of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of processes used in conjunction with the operations described herein are implemented in whole or in part using software, in one embodiment, these software elements can be implemented to operate with a computing or processing module capable of carrying out the functionality described with respect thereto. One such example-computing module is shown in FIG. 19. Various embodiments are described in terms of this example-computing module 1900. After reading this description, it will become apparent to a person skilled in the relevant art how to implement the invention using other computing modules or architectures.

Referring now to FIG. 19, computing module 1900 may represent, for example, computing or processing capabilities found within desktop, laptop and notebook computers; mainframes, supercomputers, workstations or servers; or any other type of special-purpose or general-purpose computing devices as may be desirable or appropriate for a given application or environment. Computing module 1900 might also represent computing capabilities embedded within or otherwise available to a given device. For example, a computing module might be found in other electronic devices. Computing module 1900 might include, for example, one or more processors or processing devices, such as a processor 1904. Processor 1904 might be implemented using a general-purpose or special-purpose processing engine such as, for example, a microprocessor, controller, or other control logic.

Computing module 1900 might also include one or more memory modules, referred to as main memory 1908. For example, random access memory (RAM) or other dynamic memory might be used for storing information and instructions to be executed by processor 1904. Main memory 1908 might also be used for storing temporary variables or other intermediate information during execution of instructions by processor 1904. Computing module 1900 might likewise include a read only memory ("ROM") or other static storage device coupled to bus 1902 for storing static information and instructions for processor 1904.

The computing module 1900 might also include one or more various forms of information storage mechanism 1910, which might include, for example, a media drive 1912 and a storage unit interface 1920. The media drive 1912 might include a drive or other mechanism to support fixed or removable storage media 1914. For example, a hard disk drive, a floppy disk drive, a magnetic tape drive, an optical disk drive, a CD or DVD drive (R or RW), or other removable or fixed media drive. Accordingly, storage media 1914 might include, for example, a hard disk, a floppy disk, magnetic tape, cartridge, optical disk, a CD or DVD, or other fixed or removable medium that is read by, written to or accessed by media drive 1912. As these examples illustrate, the storage media 1914 can include a computer usable storage medium having stored therein particular computer software or data.

In alternative embodiments, information storage mechanism 1910 might include other similar instrumentalities for allowing computer programs or other instructions or data to be loaded into computing module 1900. Such instrumentalities might include, for example, a fixed or removable storage unit 1922 and an interface 1920. Examples of such storage units 1922 and interfaces 1920 can include a program cartridge and cartridge interface, a removable memory (for example, a flash memory or other removable memory module) and memory slot, a PCMCIA slot and card, and other fixed or removable storage units 1922 and interfaces 1920 that allow software and data to be transferred from the storage unit 1922 to computing module 1900.

Computing module 1900 might also include a communications interface 1924. Communications interface 1924 might be used to allow software and data to be transferred between computing module 1900 and external devices. Examples of communications interface 1924 might include a modem or softmodem, a network interface (such as an Ethernet, network interface card, WiMedia, IEEE 802.XX or other interface), a communications port (such as for example, a USB port, IR port, RS232 port Bluetooth interface, or other port), or other communications interface. Software and data transferred via communications interface 1924 might typically be carried on signals, which can be electronic, electromagnetic (which includes optical) or other signals capable of being exchanged by a given communications interface 1924. These signals might be provided to communications interface 1924 via a channel 1928. This channel 1928 might carry signals and might be implemented using a wired or wireless communication medium. These signals can deliver the software and data from memory or other storage medium in one computing system to memory or other storage medium in computing system 1900. Some examples of a channel might include a phone line, a cellular link, an RF link, an optical link, a network interface, a local or wide area network, and other wired or wireless communications channels Computing module 1900 might also include a communications interface 1924. Communications interface 1924 might be used to allow software and data to be transferred between computing module 1900 and external devices. Examples of communications interface 1924 might include a modem or softmodem, a network interface (such as an Ethernet, network interface card, WiMAX, 802.XX or other interface), a communications port (such as for example, a USB port, IR port, RS232 port, Bluetooth interface, or other port), or other communications interface. Software and data transferred via communications interface 1924 might typically be carried on signals, which can be electronic, electromagnetic, optical or other signals capable of being exchanged by a given communications interface 1924. These signals might be provided to communications interface 1924 via a channel 1928. This channel 1928 might carry signals and might be implemented using a wired or wireless medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to physical storage media such as, for example, memory 1908, storage unit 1920, and media 1914. These and other various forms of computer program media or computer usable media may be involved in storing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1900 to perform features or functions of the present invention as discussed herein.

While various embodiments of the present invention have been described above, it should be understood that they have been presented by way of example only, and not of limitation. The breadth and scope of the present invention should not be limited by any of the above-described exemplary embodiments. Where this document refers to technologies that would be apparent or known to one of ordinary skill in the art, such technologies encompass those apparent or known to the skilled artisan now or at any time in the future. In addition, the invention is not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the present invention.

Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A mobile image capture and processing system for checks, comprising:
   a mobile communication device including:
      an image capturing device configured to capture an image of a check;
   a processor configured to execute program instructions to perform the operations of:
      capturing a first image of a check using the image capture device;
      automatically detecting the check within the first image, wherein automatically detecting the check further comprises
         converting the first image to a color icon image, wherein the first image is in color,
         reducing color within the color icon image, resulting in a gray-scale icon image, and
         determining a plurality of corners belonging to the check within the grey-scale icon image;
      geometrically correcting the first image, resulting in a second image;
   wherein the mobile communication device further comprises a transmitter for transmitting the second image to a server;
   a server configured to receive the second image from the mobile communication device, wherein a processor of the server is configured to execute program instructions to perform the operations of:
      binarizing the second image, resulting in a third image;
      correcting the orientation of the third image, resulting in a fourth image; and
      correcting the size of the fourth image, resulting in a fifth image; and
      outputting the fifth image of the check.

2. The system of claim 1, wherein automatically detecting the check comprises determining a plurality of corners belonging to the check within the first image.

3. The system of claim 1, wherein geometrically correcting the first image comprises:
   reducing color within the first image, wherein the first image is in color and the color reduction of the first image results in a first gray-scale image;
   building a projective transformation model, wherein the projective transformation model maps the check within the first gray-scale image to a gray-scale check image;
   applying the projective transformation model to the first image, resulting in the second image as a gray-scale check image.

4. The system of claim 3, wherein geometrically correcting the first image further comprises:
   correcting the orientation of the check within a gray-scale icon image if the check within the first image is in landscape orientation; and
   building the projective transformation model from the gray-scale icon image.

5. The system of claim 1, wherein the third image comprises a bi-tonal image.

6. The system of claim 1, wherein correcting the orientation of the third image comprises correcting the orientation of the check within the third image if the check is in upside-down orientation.

7. The system of claim 6, wherein correcting the orientation of the third image further comprises determining the orientation of the check within the third image using an MICR-line on the check.

8. A mobile image capture and processing system for checks, comprising:
   a server configured to receive a first image from a mobile communication device, the first image being a color image of a check, wherein a processor of the server is configured to execute program instructions to perform the operations of:
   automatically detecting the check within the first image;
   geometrically correcting the first image, resulting in a second image
   binarizing the second image, resulting in a third image;
   correcting the orientation of the third image, resulting in a fourth image; and
   correcting the size of the fourth image, resulting in a fifth image, wherein correcting the size of the fourth image comprises:
      reading an MICR-line at the bottom of the check within the fourth image;
      computing an average width of MICR-characters within the MICR-line;
      computing a scaling factor based on the average width of the MICR-characters;
      using the scaling factor to determine whether the fourth image needs a size correction;
      applying a size correction to the first image, resulting in a resized image;
      geometrically correcting the resized image, resulting in a corrected image; and
      binarizing the corrected image, resulting in a binarized corrected image; and
   outputting the binarized corrected image.

9. The system of claim 1, wherein outputting the fifth image of the check comprises outputting a bi-tonal image of the check.

10. The system of claim 1, wherein the mobile communication device is a camera phone.

11. A system for image capture and processing of checks, comprising:
   a server configured to receive a color image of a check from a mobile communication device, wherein a processor of the server is configured to execute program instructions to perform the operations of:
   detecting the check in the color image,
   geometrically correcting the color image and generate a gray-scale image,
   binarizing the gray-scale image to produce a bi-tonal image,
   correcting the orientation of the bi-tonal image, wherein correcting the orientation further comprises:
      reading an MICR line on the bottom of the check;
      generating a MICR confidence value for the MICR line as read;
      comparing the MICR confidence value to a threshold;
      when the MICR confidence value exceeds the threshold, determining that the bi-tonal image is right-side up; and
      when the MICR confidence value does not exceed the threshold:
         determining that the bi-tonal image is not right side up,
         rotating the image 180 degrees,
         re-reading the MICR line, generating a previously presented MICR confidence value, comparing the previously presented MICR confidence value to the previous MICR confidence value, when the previously presented MICR confidence value exceeds the first MICR confidence value, determining that the rotated, bi-tonal image is right side up, and when the previously presented MICR confidence value does not exceeds the first MICR confidence value, determining that the original un-rotated, bi-tonal image is right side up, and correcting the size of the bi-tonal image.

12. The system of claim 11, wherein the server is configured to detect the check in the color image by:
converting the color image into a smaller color image;
performing color depth reduction on the smaller color image; and
determining document corner positions for the check in the smaller color image.

13. The system of claim 12, wherein the server is configured to convert the color image into a smaller color image by:
eliminating over-sharpening in the color image;
eliminating small dark objects in the color image; and
suppressing high local contrast objects in the color image.

14. The system of claim 12, wherein the server is configured to perform color depth reduction on the smaller color image by:
dividing the smaller color image into a grid;
computing an average color for a central part of the smaller image;
computing an average color for the remainder of the smaller color image;
finding a linear transformation by mapping the central part color on white and mapping the color for the rest of the smaller image on black; and
transforming RGB values for the image into gray-shades to produce a smaller gray image.

15. The system of claim 14, wherein the server is further configured to:
find voting points in the smaller gray image for each side of the check;
find side candidates for the check based on the voting points;
choose best side candidates from the side candidates; and
determine document corner positions for the check based on the best side candidates.

16. The system of claim 11, wherein the server is configured to geometrically correct the color image and generate a geometrically corrected gray-scale image by:

reducing the color depth of the color image;
generating a gray-scale image corresponding to the color image;
applying perspective transformation to the interior of a quadrangle comprising found document corner positions included in the gray-scale image.

17. The system of claim 16, wherein the server is configured to geometrically correct the color image and generate a geometrically corrected gray-scale image by:
correcting the landscape orientation of the smaller gray-scale image based on the determined document corner positions;
building a projective transformation model of the smaller gray-scale image; and
applying perspective transformation to the interior of a quadrangle include in the smaller gray-scale image.

18. The system of claim 11, wherein the server is further configured to binarize the geometrically corrected image to produce a bi-tonal image by:
choosing a pixel on the gray-scale image;
computing an average value and standard deviation for the chosen pixel;
whether the standard deviation is too small and if it is too small then converting the chosen pixel to white and if it is not too small then converting the chosen pixel to black or white based on the intensity; and
choosing another pixel an repeating the computing and determining steps until there are no more pixels to chose.

19. A system for image capture and processing of checks, comprising:
a server configured to receive a color image from a mobile device a mobile device and to perform the operations of:
detecting the check in the color image,
geometrically correct the color image and generate a gray-scale image,
binarizing the gray-scale image to produce a bi-tonal image,
correcting the orientation of the bi-tonal image, and
correcting the size of the bi-tonal image, wherein correcting the size of the bi-tonal image further comprises:
reading an MICR line on the bottom of the check;
computing an average width of the MICR characters;
computing a scaling factor;
when the scaling factor is not greater than a threshold, outputting the bi-tonal image; and
when the scaling factor is greater than a threshold:
repeating geometric correction and binarization using recomputed dimensions for the check; and
outputting the bi-tonal image.

* * * * *